(12) United States Patent
Kuno et al.

(10) Patent No.: US 12,179,746 B2
(45) Date of Patent: Dec. 31, 2024

(54) VEHICLE COLLISION AVOIDANCE ASSIST APPARATUS AND VEHICLE COLLISION AVOIDANCE ASSIST PROGRAM

(71) Applicants: TOYOTA JIDOSHA KABUSHIKI KAISHA, Toyota (JP); DENSO CORPORATION, Kariya (JP)

(72) Inventors: Takahiro Kuno, Toyota (JP); Yuta Otsuka, Tokyo (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 251 days.

(21) Appl. No.: 17/950,551

(22) Filed: Sep. 22, 2022

(65) Prior Publication Data

US 2023/0100834 A1 Mar. 30, 2023

(30) Foreign Application Priority Data

Sep. 27, 2021 (JP) .................. 2021-156441

(51) Int. Cl.
  *B60W 30/09* (2012.01)
  *B60W 30/095* (2012.01)
  *B60W 30/18* (2012.01)

(52) U.S. Cl.
  CPC ........ *B60W 30/09* (2013.01); *B60W 30/0953* (2013.01); *B60W 30/0956* (2013.01);
  (Continued)

(58) Field of Classification Search
  CPC ............. B60W 30/09; B60W 30/0953; B60W 30/0956; B60W 30/18145; B60W 30/18159; B60W 2520/14; B60W 2540/18; B60W 2554/00; B60W 2554/40–408; B60W 2554/80; B60W 2554/801; B60W 30/12; B60W 30/16; B60W 30/162; B60W 30/165; B60W 30/17; B60W 30/182; B60W 50/082; B60K 28/00; B60K 28/02; B60K 28/04; B60K 28/06; B60K 28/063; B60K 28/066; B60K 28/08; B60K 28/10; B60K 28/12; B60K 28/14; B60K 28/16; B60K 28/165; B60K 2028/003; B60K 2028/006;
  (Continued)

(56) References Cited

U.S. PATENT DOCUMENTS 9,105,190 B2   8/2015   Akiyama
9,393,960 B2   7/2016   Kodaira
(Continued)

FOREIGN PATENT DOCUMENTS

JP   2004-224309 A   8/2004
JP   6763327 B2   9/2020

*Primary Examiner* — Hung Q Nguyen
*Assistant Examiner* — Mark L. Greene
(74) *Attorney, Agent, or Firm* — Sughrue Mion, PLLC

(57) ABSTRACT

A vehicle collision avoidance assist apparatus keeps stopping a collision avoidance control to avoid a collision of an own vehicle with an object ahead of the own vehicle when the own vehicle turns, a predetermined condition is satisfied, and a collision condition is satisfied. While the own vehicle turns, the apparatus acquires an own vehicle turning angle which is an angle which the own vehicle has turned about a turning center from when the own vehicle starts turning and change the predetermined condition, depending on the own vehicle turning angle.

7 Claims, 16 Drawing Sheets

(52) U.S. Cl.
CPC ................ *B60W 30/18145* (2013.01); *B60W 30/18159* (2020.02); *B60W 2520/14* (2013.01); *B60W 2540/18* (2013.01); *B60W 2554/4029* (2020.02); *B60W 2554/4041* (2020.02); *B60W 2554/801* (2020.02)

(58) Field of Classification Search
CPC .... G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | |
|---|---|---|
| 9,483,945 B2 | 11/2016 | Okita et al. |
| 9,873,412 B2 | 1/2018 | Moriizumi |
| 10,580,303 B2 * | 3/2020 | Morotomi .............. G08G 1/165 |
| 10,793,147 B2 | 10/2020 | Kaminade et al. |
| 2018/0268696 A1 | 9/2018 | Morotomi et al. |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |

* cited by examiner

VEHICLE COLLISION AVOIDANCE ASSIST APPARATUS AND VEHICLE COLLISION AVOIDANCE ASSIST PROGRAM

CROSS-REFERENCE TO RELATED APPLICATIONS

This application claims priority to Japanese patent application No. JP 2021-156441 filed on Sep. 27, 2021, the content of which is hereby incorporated by reference in its entirety.

BACKGROUND

Field

The invention relates to a vehicle collision avoidance assist apparatus and a vehicle collision avoidance assist program.

Description of the Related Art

There is known a vehicle collision avoidance assist apparatus which executes a collision avoidance control for avoiding a collision of an own vehicle with an object such as another vehicle or a person ahead of the own vehicle. The known vehicle collision avoidance assist apparatus is configured to detect the object ahead of the own vehicle, based on information acquired by radars and/or cameras and execute the collision avoidance control to autonomously stop the own vehicle when the known vehicle collision avoidance assist apparatus determines that the own vehicle is going to collide with the detected object.

When a driver orients the own vehicle rightward to change traffic lanes, an oncoming vehicle may be detected as the object ahead of the own vehicle. If the oncoming vehicle is detected as the object ahead of the own vehicle, the own vehicle may be determined to be going to collide with the detected oncoming vehicle, and the collision avoidance control may be executed. However, actually, after the own vehicle completes changing the traffic lanes, the own vehicle is oriented so as to move along the traffic lane. Thus, the own vehicle does not collide with the detected oncoming vehicle. Thus, an execution of the collision avoidance control in such a situation is unnecessary.

Accordingly, there is known the vehicle collision avoidance assist apparatus which is configured not to execute the collision avoidance control while the own vehicle changes the traffic lanes (for example, see JP 6763327 B). This known vehicle collision avoidance assist apparatus is configured not to collision avoidance control when a reversed steering operation is carried out after the driver starts to change the traffic lanes. The reversed steering operation is an operation applied to a steering wheel by the driver to turn the steering wheel in a direction opposite to a direction of turning the steering wheel when the driver starts to change the traffic lanes.

In this regard, when the driver turns the own vehicle right or left at a traffic intersection, the driver turns the steering wheel in one direction to start to turn the own vehicle right or left and then, turns the steering wheel in a direction opposite to the one direction, i.e., carries out the reversed steering operation. Thus, if the collision avoidance control is kept stopped in response to the reversed steering operation being carried out, the collision avoidance control is not executed when the own vehicle turns right or left.

SUMMARY

An object of the invention is to provide a vehicle collision avoidance assist apparatus and a vehicle collision avoidance assist program which can avoid an unnecessary execution of the collision avoidance control when the own vehicle changes the traffic lanes without eliminating the execution of the collision avoidance control when the own vehicle turns right or left.

According to the invention a vehicle collision avoidance assist apparatus comprises an electronic control unit. The electronic control unit is configured to keep stopping a collision avoidance control to avoid a collision of an own vehicle with an object ahead of the own vehicle when the own vehicle turns, a predetermined condition is satisfied, and a collision condition is satisfied. The predetermined condition being a condition relating to a steered state of the own vehicle. The collision condition being a condition that the own vehicle is going to collide with the object. The electronic control unit is configured to execute the collision avoidance control when the own vehicle turns, the predetermined condition is not satisfied, and the collision condition is satisfied.

While the own vehicle turns, the electronic control unit is configured to acquire an own vehicle turning angle which is an angle which the own vehicle has turned about a turning center from when the own vehicle starts turning, and change the predetermined condition, depending on the own vehicle turning angle.

When the own vehicle changes traffic lanes to a right traffic lane, the own vehicle is oriented rightward and then, leftward and the, completes changing the traffic lanes. Thus, while the own vehicle changes the traffic lanes to the right traffic lane, a steered angle of the own vehicle changes in one direction and then, in the other direction and then, the own vehicle completes changing the traffic lanes.

On the other hand, when the own vehicle turns right, the steered angle of the own vehicle gradually increases and then, gradually decreases and then, the own vehicle completes turning right. Thus, while the own vehicle turns right, the steered angle of the own vehicle changes in one direction and then, in the other direction.

That is, both in a scene that the own vehicle changes the traffic lanes to the right traffic lane and in a scene that the own vehicle turns right, the steered angle of the own vehicle changes in one direction and then, in the other direction. However, the own vehicle turning angle when a changing direction of the steered angle of the own vehicle changes from one direction to the other direction, is different between the scene that the own vehicle changes the traffic lanes to the right traffic lane and the scene that the own vehicle turns right. Thus, an execution of the collision avoidance control can be avoided when the own vehicle changes the traffic lanes to the right traffic lane by changing the predetermined condition used to determine whether to keep stopping the collision avoidance control. This is also applied to a scene that the own vehicle changes the traffic lanes to a left traffic lane and a scene that the own vehicle turns left.

With the invention, the predetermined condition is changed, depending on the own vehicle turning angle. Thus, the unnecessary execution of the collision avoidance control can be avoided when the own vehicle changes the traffic lanes without eliminating the execution of the collision avoidance control when the own vehicle turns right or left.

According to an aspect of the invention, the electronic control unit may be configured to acquire as the steered state, at least one parameter representing the steered state with a positive or negative sign. In this aspect, the predetermined condition may be a condition which is satisfied in response to acquiring the parameter with a sign opposite to the sign at a point of time when the own vehicle starts to turn.

As described above, when the own vehicle changes the traffic lanes to the right traffic lane, the own vehicle is oriented rightward and then, leftward and then, completes changing the traffic lanes. Thus, while the own vehicle changes the traffic lanes to the right traffic lane, the sign of the parameter representing the steered state is reversed.

On the other hand, when the own vehicle turns right, the steered angle of the own vehicle gradually increases and then, gradually decreases and then, the own vehicle completes turning right. Thus, also while the own vehicle turns right, the sign of the parameter representing the steered state is reversed.

Both in the scene that the own vehicle changes the traffic lanes to the right traffic lane and the scene that the own vehicle turns right, the sign of the parameter representing the steered state is reversed. However, the own vehicle turning angle when the sign of the parameter representing the steered state is reversed, is different between the scene that the own vehicle changes the traffic lanes to the right traffic lane and the scene that the own vehicle turns right. Thus, the execution of the collision avoidance control can be avoided when the own vehicle changes the traffic lanes to the right traffic lane by (i) using as the predetermined condition, a condition which becomes satisfied in response to acquiring the parameter with the sign opposite to the sign at a point of time when the own vehicle starts to turn and (ii) changing the predetermined condition, depending on the own vehicle turning angle. This is also applied to the scene that the own vehicle changes the traffic lanes to the left traffic lane and the scene that the own vehicle turns left.

With this aspect of the invention, (i) the parameter representing the steered state of the own vehicle with the positive or negative sign is acquired as the steered state of the own vehicle, (ii) the condition which becomes satisfied in response to acquiring the parameter with the sign opposite to the sign at a point of time when the own vehicle starts to turn, is used as the predetermined condition, and (iii) the predetermined condition is changed, depending on the own vehicle turning angle. Thus, the unnecessary execution of the collision avoidance control can be avoided when the own vehicle changes the traffic lanes without eliminating the execution of the collision avoidance control when the own vehicle turns right or left by using the sign of the parameter representing the steered state.

According to another aspect of the invention, the electronic control unit may be configured to acquire as the steered state, a reversed steering operation applied to the own vehicle. In this aspect, the predetermined condition may be a condition which is satisfied when the own vehicle turning angle is equal to or smaller than a predetermined own vehicle turning angle threshold, and the reversed steering operation is carried out after the own vehicle starts to turn.

As described above, when the own vehicle changes the traffic lanes to the right traffic lane, the own vehicle is oriented rightward and then, leftward and then, completes changing the traffic lanes. Thus, while the own vehicle changes the traffic lanes to the right traffic lane, the reversed steering operation is carried out.

On the other hand, when the own vehicle turns right, the steered angle of the own vehicle gradually increases and then, gradually decreases and then, the own vehicle completes turning right. Thus, while the own vehicle turns right, the reversed steering operation is also carried out.

Thus, both in the scene that the own vehicle changes the traffic lanes to the right traffic lane is carried out and in the scene that the own vehicle turns right, the reversed steering operation is carried out. However, the own vehicle turning angle when the reversed steering operation is carried out, is different between the scene that the own vehicle changes the traffic lanes to the right traffic lane and the scene that the own vehicle turns right. Thus, the execution of the collision avoidance control can be avoided in the scene that the own vehicle changes the traffic lanes to the right traffic lane by (i) using as the predetermined condition, a condition which becomes satisfied in response to the reversed steering operation being carried out when the own vehicle turning angle is small after the own vehicle starts to turn and (ii) changing the predetermined condition, depending on the own vehicle turning angle. This is also applied to the scene that the own vehicle changes the traffic lanes to the left traffic lane and the scene that the own vehicle turns left.

With this aspect of the invention, (i) the predetermined condition is the condition which becomes satisfied in response to the reversed steering operation being carried out when the own vehicle turning angle is equal to or smaller than the predetermined own vehicle turning angle threshold after the own vehicle starts to turn, and (ii) the predetermined condition is changed, depending on the own vehicle turning angle. Thus, the unnecessary execution of the collision avoidance control can be avoided when the own vehicle changes the traffic lanes without eliminating the execution of the collision avoidance control when the own vehicle turns right or left by using the reversed steering operation.

According to further another aspect of the invention, the electronic control unit may be configured to acquire as the steered state of the own vehicle, a steering angle changing speed with a positive or negative sign which corresponds to a changing amount per unit time of the steered angle of the own vehicle. In this aspect, the predetermined condition may be a condition which is satisfied when an absolute value of the steering angle changing speed is equal to or greater than a predetermined steering angle changing speed threshold.

As described above, when the own vehicle changes the traffic lanes to the right traffic lane, the own vehicle is oriented rightward and then, leftward and then, completes changing the traffic lanes. Thus, while the own vehicle changes the traffic lanes to the right traffic lane, the steering angle changing speed changes with a peak on one of a positive side and a negative side and then, changes with a peak on the other side.

On the other hand, when the own vehicle turns right, the steered angle of the own vehicle gradually increases and then, gradually decreases and then, the own vehicle completes turning right. Thus, while the own vehicle turns right, the steering angle changing speed changes with a peak on one of the positive side and the negative side and then, changes with a peak on the other side.

Thus, both in the scene that the own vehicle changes the traffic lanes to the right traffic lane is carried out and in the scene that the own vehicle turns right, the steering angle changing speed changes with a peak on one of the positive side and the negative side and then, changes with a peak on the other side. However, the own vehicle turning angle when the steering angle changing speed takes a peak at the other side, is different between the scene that the own vehicle changes the traffic lanes to the right traffic lane and the scene that the own vehicle turns right. Thus, the execution of the collision avoidance control can be avoided in the scene that the own vehicle changes the traffic lanes to the right traffic lane by (i) using as the predetermined condition, a condition which is satisfied when the absolute value of the steering angle changing speed is equal to or greater than the predetermined steering angle changing speed and (ii) changing the predetermined condition, depending on the own vehicle turning angle. This is also applied to the scene that the own vehicle changes the traffic lanes to the left traffic lane and the scene that the own vehicle turns left.

With this aspect of the invention, (i) the predetermined condition is the condition which is satisfied when the absolute value of the steering angle changing speed is equal to or greater than the predetermined steering angle changing speed, and (ii) the predetermined condition is changed, depending on the own vehicle turning angle. Thus, the unnecessary execution of the collision avoidance control can be avoided when the own vehicle changes the traffic lanes without eliminating the execution of the collision avoidance control when the own vehicle turns right or left by using the steering angle changing speed.

According to further another aspect of the invention, the electronic control unit may be configured to predict a turning route of an own vehicle and a moving route of an object ahead of the own vehicle when the own vehicle turns, acquire a predicted reaching time which is a time predicted to be taken for the own vehicle to reach the moving route of the object, and acquire an object position which is a position of the object with respect to the own vehicle when the own vehicle reaches the moving route of the object. In this aspect, the collision condition may become satisfied when (i) the turning route of the own vehicle crosses the moving route of the object, (ii) the predicted reaching time is equal to or smaller than a predetermined predicted reaching time, and (iii) the object position is within a width of the own vehicle.

With this aspect of the invention, whether the own vehicle is going to collide with the object, i.e., whether the collision condition is satisfied, is determined, based on (i) the predicted reaching time predicted to be taken until the own vehicle reaches the moving route of the object and (ii) the object position of the object with respect to the own vehicle when the own vehicle reaches the moving route of the object. Thus, the probability that the own vehicle collides with the object can be accurately determined.

According to further another aspect of the invention, the electronic control unit may be configured to predict the turning route of the own vehicle, based on a yaw rate of the own vehicle.

With this aspect of the invention, the turning route of the own vehicle can be predicted, based on the yaw rate of the own vehicle which can be acquired by a sensor such as a yaw rate sensor.

According to the invention, a vehicle collision avoidance assist program programmed to keep stopping a collision avoidance control to avoid a collision of an own vehicle with an object ahead of the own vehicle when the own vehicle turns, a predetermined condition is satisfied, and a collision condition is satisfied. The predetermined condition being a condition relating to a steered state of the own vehicle. The collision condition being a condition that the own vehicle is going to collide with the object. The vehicle collision avoidance assist program is programmed to execute the collision avoidance control when the own vehicle turns, the predetermined condition is not satisfied, and the collision condition is satisfied.

While the own vehicle turns, the vehicle collision avoidance assist program is configured to acquire an own vehicle turning angle which is an angle which the own vehicle has turned about a turning center from when the own vehicle starts turning and change the predetermined condition, depending on the own vehicle turning angle.

With the invention, for the same reasons described above, the unnecessary execution of the collision avoidance control can be avoided when the own vehicle changes the traffic lanes without eliminating the execution of the collision avoidance control when the own vehicle turns right or left.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
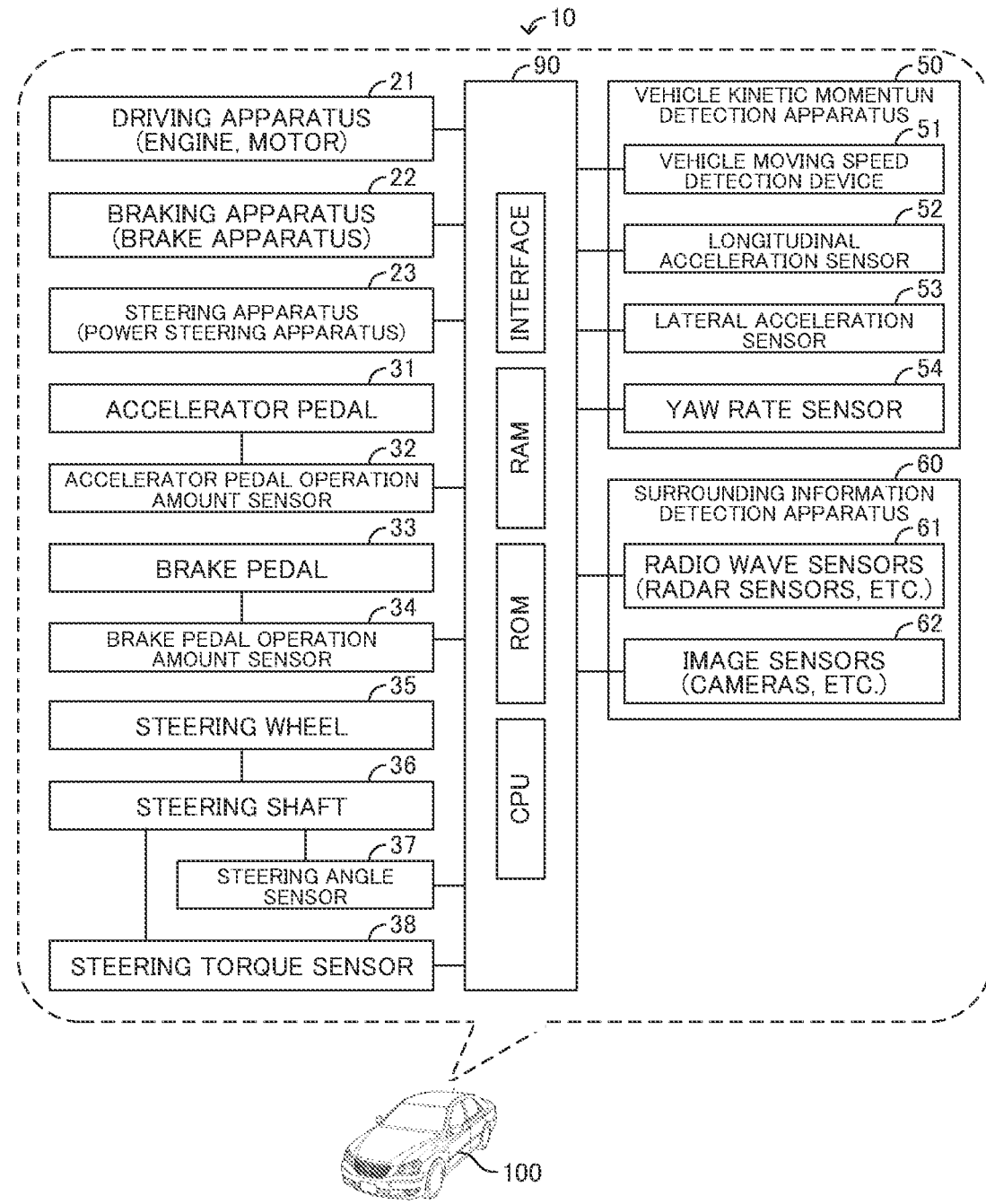
FIG. 1 is a view which shows a vehicle collision avoidance assist apparatus according to an embodiment of the invention and a vehicle, i.e., an own vehicle on which the vehicle collision avoidance assist apparatus is installed.

Below, a vehicle collision avoidance assist apparatus according to an embodiment of the invention will be described with reference to the drawings. It should be noted that the invention can be applied to an autonomous driving vehicle or an automatic driving vehicle. As shown in FIG. 1, the vehicle collision avoidance assist apparatus 10 according to the embodiment of the invention is installed on an own vehicle 100. Hereinafter, a driver of the own vehicle 100 will be referred to as "driver DR."

<ECU>

The vehicle collision avoidance assist apparatus 10 includes an ECU 90 as a control device. The ECU 90 is an electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM.

<Driving Apparatus, Etc.>

A driving apparatus 21, a braking apparatus 22, and a steering apparatus 23 are installed on the own vehicle 100.

<Driving Apparatus>

The driving apparatus 21 is an apparatus which outputs a driving torque or a driving force to be applied to the own vehicle 100 to move the own vehicle 100. The driving apparatus 21 may include an internal combustion engine and at least one electric motor. The driving apparatus 21 is electrically connected to the ECU 90. The ECU 90 can control the driving torque output from the driving apparatus 21 by controlling operations of the driving apparatus 21.

<Braking Apparatus>

The braking apparatus 22 is an apparatus which outputs a braking torque or a braking force to be applied to the own vehicle 100 to brake the own vehicle 100. The braking apparatus 22 may be a brake apparatus. The braking apparatus 22 is electrically connected to the ECU 90. The ECU 90 can control the braking torque output from the braking apparatus 22 by controlling operations of the braking apparatus 22.

<Steering Apparatus>

The steering apparatus 23 is an apparatus which outputs a steering torque or a steering force to be applied to the own vehicle 100 to steer the own vehicle 100. The steering apparatus 23 may be a power steering apparatus. The steering apparatus 23 is electrically connected to the ECU 90. The ECU 90 can control the steering torque output from the steering apparatus 23 by controlling operations of the steering apparatus 23.

<Sensors, Etc.>

Further, an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle kinetic momentum detection apparatus 50, and a surrounding information detection apparatus 60 are installed on the own vehicle 100.

<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32. The ECU 90 calculates and acquires a requested driving torque or a requested driving force, based on the accelerator pedal operation amount AP and an own vehicle moving speed, i.e., a moving speed of the own vehicle 100 when a collision avoidance control described later in detail is not executed.

The requested driving torque is the driving torque requested for the driving apparatus 21 to output. The ECU 90 controls the operations of the driving apparatus 21 so as to output the driving torque corresponding to the requested driving torque.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal operation amount sensor 34. The ECU 90 calculates and acquires a requested braking torque or a requested braking force, based on the brake pedal operation amount BP when the collision avoidance control described later in detail is not executed. The requested braking torque is the braking torque requested for the braking apparatus 22 to output. The ECU 90 controls the operations of the braking apparatus 22 so as to output the braking torque corresponding to the requested braking torque.

<Steering Angle Sensor>

The steering angle sensor 37 is a sensor which detects a rotation angle of the steering shaft 36 with respect to its neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle θ, based on the information sent from the steering angle sensor 37. In this embodiment, the ECU 90 acquires the positive steering angle θ when the steering wheel 35 is rotated to rotate the steering shaft 36 clockwise. On the other hand, the ECU 90 acquires the negative steering angle θ when the steering wheel 35 is rotated to rotate the steering shaft 36 counterclockwise. When the steering wheel 35 is at its neutral position, and thus the steering shaft 36 is also at its neutral position, the steering angle θ which the ECU 90 acquires, is zero.

<Steering Torque Sensor>

The steering torque sensor 38 is a sensor which detects a torque which the driver DR inputs to the steering shaft 36 via the steering wheel 35. The steering torque sensor 38 is electrically connected to the ECU 90. The steering torque sensor 38 sends information on the detected torque to the ECU 90. The ECU 90 acquires the torque which the driver DR inputs to the steering shaft 36 via the steering wheel 35 as a driver input torque TQdr, based on the information sent from the steering torque sensor 38.

<Vehicle Kinetic Momentum Detection Apparatus>

The vehicle kinetic momentum detection apparatus 50 is an apparatus which detects kinetic momentum of the own vehicle 100. In this embodiment, the vehicle kinetic momentum detection apparatus 50 includes a vehicle moving speed detection device 51, a longitudinal acceleration sensor 52, a lateral acceleration sensor 53, and a yaw rate sensor 54.

<Vehicle Moving Speed Detection Device>

The vehicle moving speed detection device 51 is a device which detects the own vehicle moving speed, i.e., the moving speed of the own vehicle 100. The vehicle moving speed detection device 51 may include vehicle wheel rotation speed sensors. The vehicle moving speed detection device 51 is electrically connected to the ECU 90. The vehicle moving speed detection device 51 sends information on the detected moving speed of the own vehicle 100 to the ECU 90. The ECU 90 acquires the moving speed of the own vehicle 100 as the own vehicle moving speed Vego, based on the information sent from the vehicle moving speed detection device 51.

The ECU 90 calculates and acquires a requested steering torque, based on the steering angle θ, the driver input torque TQdr, and the own vehicle moving speed Vego. The requested steering torque is the steering torque requested for the steering apparatus 23 to output. The ECU 90 controls the operations of the steering apparatus 23 so as to output the steering torque corresponding to the requested steering torque.

<Longitudinal Acceleration Sensor>

The longitudinal acceleration sensor 52 is a sensor which detects an acceleration of the own vehicle 100 in a longitudinal direction of the own vehicle 100. The longitudinal acceleration sensor 52 is electrically connected to the ECU 90. The longitudinal acceleration sensor 52 sends information on the detected acceleration to the ECU 90. The ECU 90 acquires the acceleration of the own vehicle 100 in the longitudinal direction of the own vehicle 100 as a longitudinal acceleration Gx, based on the information sent from the longitudinal acceleration sensor 52.

<Lateral Acceleration Sensor>

The lateral acceleration sensor 53 is a sensor which detects an acceleration of the own vehicle 100 in a lateral or width direction of the own vehicle 100. The lateral acceleration sensor 53 is electrically connected to the ECU 90. The lateral acceleration sensor 53 sends information on the detected acceleration to the ECU 90. The ECU 90 acquires the acceleration of the own vehicle 100 in the lateral or width direction of the own vehicle 100 as a lateral acceleration Gy, based on the information sent from the lateral acceleration sensor 53.

<Yaw Rate Sensor>

The yaw rate sensor 54 is a sensor which detects a yaw rate of the own vehicle 100. The yaw rate sensor 54 is electrically connected to the ECU 90. The yaw rate sensor 54 sends information on the detected yaw rate to the ECU 90. The ECU 90 acquires the yaw rate of the own vehicle 100 as an own vehicle yaw rate ω, based on the information sent from the yaw rate sensor 54.

<Surrounding Information Detection Apparatus>

The surrounding information detection apparatus 60 is an apparatus which detects information on a situation around the own vehicle 100. In this embodiment, the surrounding information detection apparatus 60 includes radio wave sensors 61 and image sensors 62. The radio wave sensor 61 may be a radar sensor such as a millimeter wave radar. The image sensor 62 may be a camera. It should be noted that the surrounding information detection apparatus 60 may include sonic wave sensors such as ultrasonic wave sensors such as clearance sonars and optical sensors such as laser radars such as LiDAR.

<Radio Wave Sensors>

The radio wave sensors 61 are electrically connected to the ECU 90. The radio wave sensor 61 transmits radio waves and receives reflected waves, i.e., the radio waves reflected by objects such as vehicles and persons. The radio wave sensor 61 sends detection results, i.e., information on the transmitted radio waves and the received reflected waves to the ECU 90. In other words, the radio wave sensor 61 detects objects around the own vehicle 100 and sends the detection results, i.e., the information on the detected objects. The ECU 90 can acquire the information on the objects around the own vehicle 100 as surrounding detection information INF_S, based on the information or radio wave information sent from the radio wave sensors 61.

<Image Sensors>

The image sensors 62 are electrically connected to the ECU 90. The image sensor 62 takes images of a view around the own vehicle 100 and sends information on the taken images to the ECU 90. The ECU 90 can acquire the information on the surroundings of the own vehicle 100 as the surrounding detection information INF_S, based on the information or image information sent from the image sensors 62.

<Summary of Operations of Vehicle Collision Avoidance Assist Apparatus>

Next, a summary of operations of the vehicle collision avoidance assist apparatus 10 will be described.

The vehicle collision avoidance assist apparatus 10 executes a collision avoidance control to control the operations of the driving apparatus 21 and the braking apparatus 22 when (i) the own vehicle 100 turns, (ii) a collision avoidance forbiddance condition described later in detail is not satisfied, and (iii) a collision condition is satisfied. The collision avoidance control is a control for avoiding a collision of the own vehicle 100 with the object. The collision avoidance forbiddance condition is a predetermined condition on a steered state of the own vehicle 100. The collision condition is a condition that the own vehicle 100 has a probability to collide with the object ahead of the own vehicle 100. On the other hand, the vehicle collision avoidance assist apparatus 10 does not execute the collision avoidance control when (i) the own vehicle 100 turns, (ii) the collision avoidance forbiddance condition is satisfied, and (iii) the collision condition is satisfied. It should be noted that in this embodiment, the vehicle collision avoidance assist apparatus 10 is configured to execute an ordinary moving control when the vehicle collision avoidance assist apparatus 10 does not the collision avoidance control.

<Ordinary Moving Control>

The ordinary moving control is a control to control the operations of the driving apparatus 21 and the braking apparatus 22, depending on operations applied to the accelerator pedal 31 and the brake pedal 33 by the driver DR. In particular, the ordinary moving control is the control to control the operations of the driving apparatus 21 so as to output the driving torque corresponding to the requested driving torque or the driving force corresponding to the requested driving force which is set, based on the accelerator pedal operation amount AP when the accelerator pedal operation amount AP is greater than zero. In addition, the ordinary moving control is the control to control the operations of the braking apparatus 22 so as to output the braking torque corresponding to the requested braking torque or the braking force corresponding to the requested braking force which is set, based on the brake pedal operation amount BP when the brake pedal operation amount BP is greater than zero.

<Collision Avoidance Control>

The collision avoidance control is a control to forcibly brake the own vehicle 100 to stop the own vehicle 100 independently of the operations of the accelerator pedal 31 and the brake pedal 33 applied by the driver DR to avoid the own vehicle 100 from colliding with the object such as a pedestrian walking across a road which the own vehicle 100 turning right or left reaches, in particular, a pedestrian walking along a sidewalk or a pedestrian crossing provided on the road which the own vehicle 100 turning right or left reaches when the own vehicle 100 turns right or left at a traffic intersection. Below, the collision avoidance control will be described in detail.

The vehicle collision avoidance assist apparatus 10 determines whether the own vehicle 100 turns, based on the steering angle θ while the vehicle collision avoidance assist apparatus 10 is activated. When the steering angle θ is greater than zero, the vehicle collision avoidance assist apparatus 10 determines that the own vehicle 100 turns right. On the other hand, when the steering angle θ is smaller than zero, the vehicle collision avoidance assist apparatus 10 determines that the own vehicle 100 turns left. When the steering angle θ is greater or smaller than zero, the vehicle collision avoidance assist apparatus 10 determines that the own vehicle 100 turns, and thus an own vehicle turning condition C1 is satisfied.

In addition, the vehicle collision avoidance assist apparatus 10 executes an object detection process while the vehicle collision avoidance assist apparatus 10 is activated. The object detection process is a process to detect the object ahead of the own vehicle 100, based on the surrounding detection information INF_S.

Figure 2:
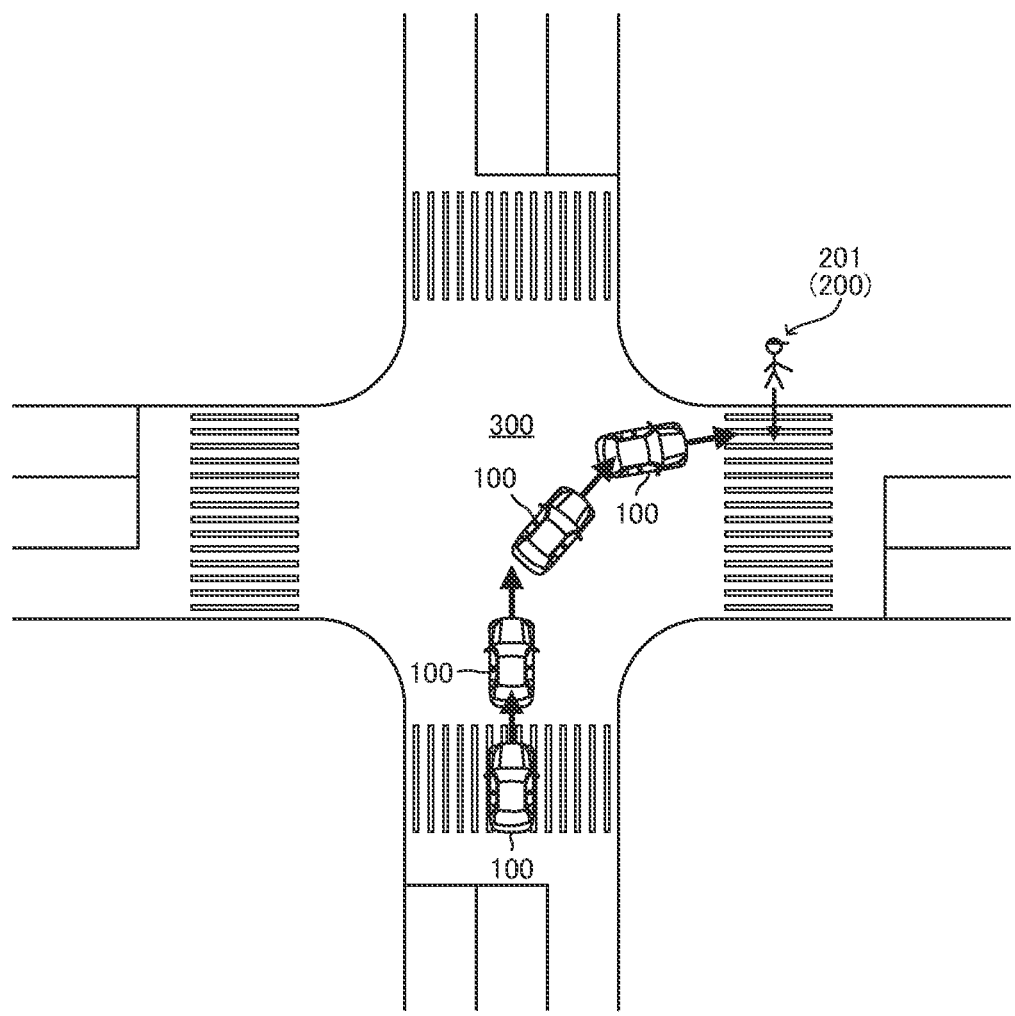
FIG. 2 is a view which shows a scene that the own vehicle turns right at a traffic intersection.
Figure 3:
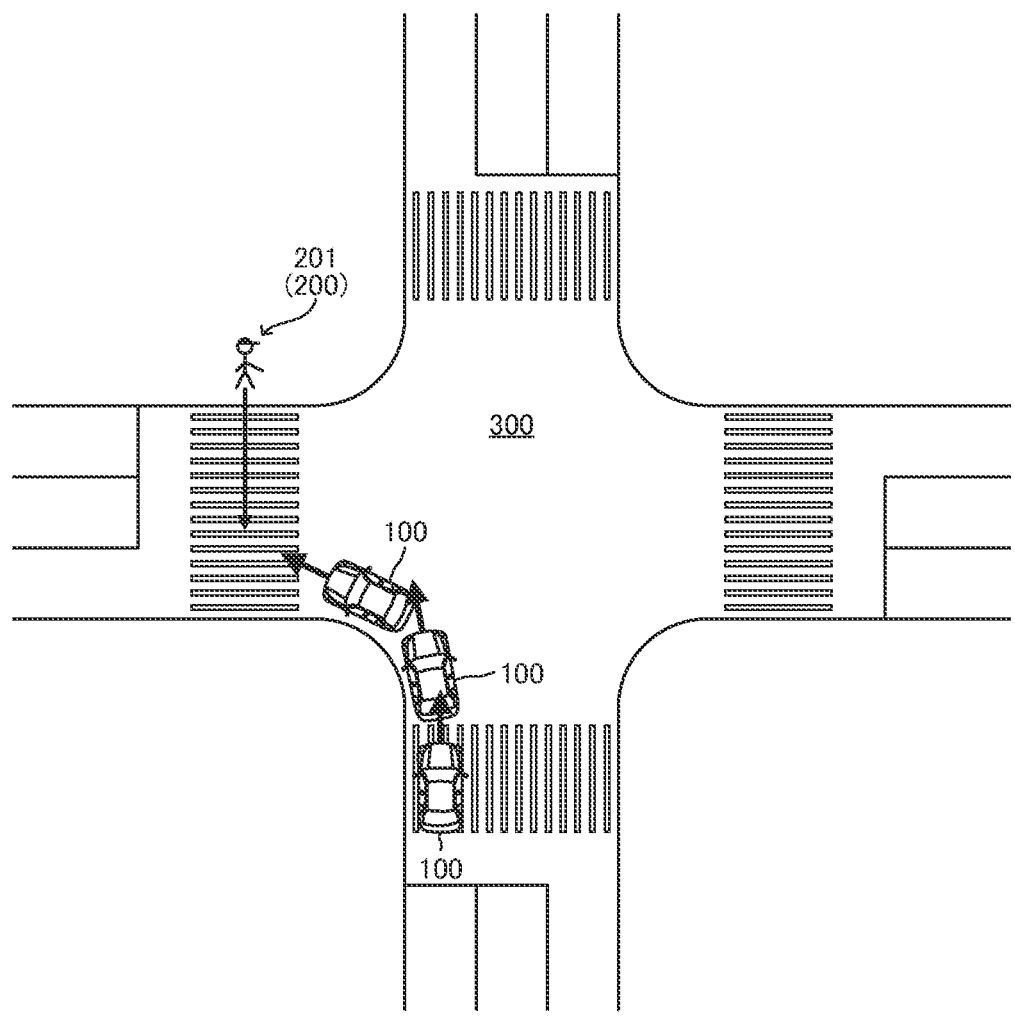
FIG. 3 is a view which shows a scene that the own vehicle turns left at the traffic intersection.

For example, as shown in FIG. 2, when the own vehicle 100 turns right at a traffic intersection 300, and there is a pedestrian 201 walking along the crosswalk or the pedestrian crossing ahead of the own vehicle 100, the vehicle collision avoidance assist apparatus 10 detects the pedestrian 201 as the object by the object detection process. Similarly, as shown in FIG. 3, when the own vehicle 100 turns left at the traffic intersection 300, and there is the pedestrian 201 walking along the crosswalk or the pedestrian crossing ahead of the own vehicle 100, the vehicle collision avoidance assist apparatus 10 detects the pedestrian 201 as the object by the object detection process.

When the own vehicle turning condition C1 is satisfied, i.e., the own vehicle 100 turns, and the vehicle collision avoidance assist apparatus 10 detects the object ahead of the own vehicle 100, the own vehicle 100 executes a collision determination process to determine whether the own vehicle 100 is going to collide with the detected object 200. The collision determination process has processes described below.

First, the vehicle collision avoidance assist apparatus 10 acquires a moving speed of the detected object 200 at a current time tnow as an object ground speed Vtgt, based on the surrounding detection information INF_S and acquires an object ground speed X-component Vtgt_x and an object ground speed Y-component Vtgt_y by a calculation using formulas (1) and (2) described below, based on the object ground speed Vtgt.

$$Vtgt\_x = Vtgt \cdot \sin\theta \quad (1)$$

$$Vtgt\_y = Vtgt \cdot \cos\theta \quad (2)$$

The object ground speed X-component Vtgt_x is an X-axis component of the object ground speed Vtgt of the current time tnow on an own vehicle coordinate system CS of the current time tnow. The object ground speed Y-component Vtgt_y is a Y-axis component of the object ground speed Vtgt of the current time tnow on the own vehicle coordinate system CS of the current time tnow.

Figure 4:
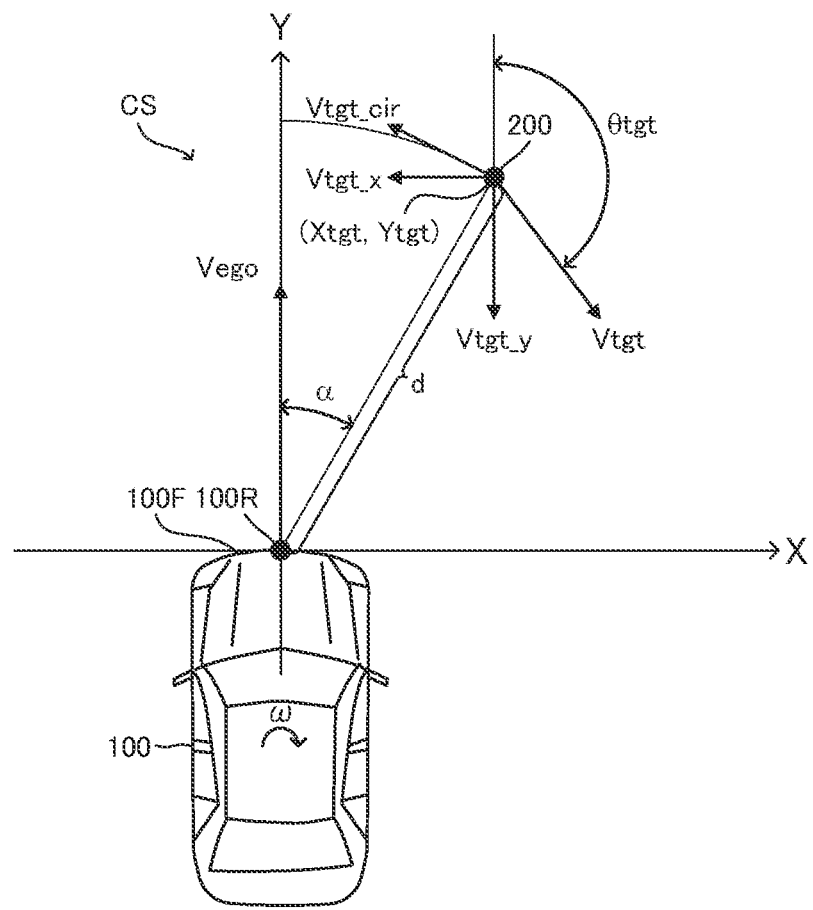
FIG. 4 is a view which shows an object speed, etc. on an own vehicle coordinate system.

As shown in FIG. 4, the own vehicle coordinate system CS is a coordinate system which is defined by (i) an origin corresponding to an own vehicle reference point 100R, (ii) an X-axis along the width direction of the own vehicle 100, and (iii) a Y-axis along the longitudinal direction of the own vehicle 100. The own vehicle 100 R is a center point of a front edge 100F of the own vehicle 100 in the width direction of the own vehicle 100. As can be understood from FIG. 4, on the own vehicle coordinate system CS, values at the right side of the origin (i.e., the own vehicle reference point 100R) or rightward with respect to the origin take positive values, and values at the left side of the origin (i.e., the own vehicle reference point 100R) or leftward with respect to the origin take negative values.

Further, the vehicle collision avoidance assist apparatus 10 acquires an own vehicle moving speed X-component Vego_x and an own vehicle moving speed Y-component Vego_y by a calculation using formulas (3) and (4) described below, based on the own vehicle moving speed Vego of the current time tnow.

$$Vego\_x = 0 \quad (3)$$

$$Vego\_y = -Vego \quad (4)$$

The own vehicle moving speed X-component Vego_x is an X-axis component of the own vehicle moving speed Vego of the current time tnow on the own vehicle coordinate system CS of the current time tnow. The own vehicle moving speed Y-component Vego_y is a Y-axis component of the own vehicle moving speed Vego of the current time tnow on the own vehicle coordinate system CS of the current time tnow.

Further, the vehicle collision avoidance assist apparatus 10 acquires an object X-coordinate Xtgt of the current time tnow and an object Y-coordinate Ytgt of the current time tnow, based on the surrounding detection information INF_S and acquires an object orientation angle α and an object distance d by a calculation using formulas (5) and (6) described below, based on the object X-coordinate Xtgt and the object Y-coordinate Ytgt.

$$\alpha = a\tan 2(Xtgt, Ytgt) \quad (5)$$

$$d = \sqrt{(Xtgt^2 + Ytgt^2)} \quad (6)$$

The object X-coordinate Xtgt is an X-coordinate of the detected object 200 of the current time tnow on the own vehicle coordinate system CS of the current time tnow. Thus, the object X-coordinate Xtgt represents a position of the detected object 200 of the current time tnow in the width direction of the own vehicle 100 with respect to the own vehicle reference point 100R of the current time tnow.

The object Y-coordinate Ytgt is a Y-coordinate of the detected object 200 on the own vehicle coordinate system CS of the current time tnow. Thus, the object X-coordinate Xtgt represents a position of the detected object 200 of the current time tnow in the longitudinal direction of the own vehicle 100 with respect to the own vehicle reference point 100R of the current time tnow.

The object orientation angle α is an angle defined by the Y-axis and a line connecting the own vehicle reference point 100R of the current time tnow and the detected object 200 of the current time tnow on the own vehicle coordinate system CS of the current time tnow. Thus, the object orientation angle α represents an orientation of the detected object 200 of the current time tnow with respect to the own vehicle reference point 100R of the current time tnow.

The object distance d is a distance between the own vehicle reference point 100R of the current time tnow and the detected object 200 of the current time tnow on the own vehicle coordinate system CS of the current time tnow. Thus, the object distance d represents the distance between the own vehicle reference point 100R of the current time tnow and the detected object 200 of the current time tnow.

Then, the vehicle collision avoidance assist apparatus 10 acquires an object ground peripheral speed Vtgt_cir by a calculation using a formula (7) described below, based on the acquired object distance d of the current time tnow and the acquired own vehicle yaw rate ω of the current time tnow.

$$Vtgt\_cir = -d \cdot \omega \tag{7}$$

The object ground peripheral speed Vtgt_cir is a moving speed of the detected object 200 of the current time tnow along a circular arc about the own vehicle reference point 100R of the current time tnow.

Further, the vehicle collision avoidance assist apparatus 10 acquires an object ground peripheral speed X-component Vtgt_cir_x and an object ground peripheral speed Y-component Vtgt_cir_y by a calculation using formulas (8) and (9) described below, based on the acquired object ground peripheral speed Vtgt_cir of the current time tnow and the acquired object orientation angle α of the current time tnow.

$$Vtgt\_cir\_x = Vtgt\_cir \cdot \cos \alpha \tag{8}$$

$$Vtgt\_cir\_y = -Vtgt\_cir \cdot \sin \alpha \tag{9}$$

The object ground peripheral speed X-component Vtgt_cir_x is an X-coordinate component of the object ground peripheral speed Vtgt_cir of the current time tnow on the own vehicle coordinate system CS of the current time tnow. The object ground peripheral speed Y-component Vtgt_cir_y is a Y-coordinate component of the object ground peripheral speed Vtgt_cir of the current time tnow on the own vehicle coordinate system CS of the current time tnow.

Then, the vehicle collision avoidance assist apparatus 10 acquires an object relative speed X-component Vtgt_rel_x by a calculation using a formula (10) described below, based on the acquired object ground speed X-component Vtgt_x, the acquired own vehicle moving speed X-component Vego_x, and the acquired object ground peripheral speed X-component Vtgt_cir_x. In addition, the vehicle collision avoidance assist apparatus 10 acquires an object relative speed Y-component Vtgt_rel_y by a calculation using a formula (11) described below, based on the acquired object ground speed Y-component Vtgt_y, the acquired own vehicle moving speed Y-component Vego_y and the acquired object ground peripheral speed Y-component Vtgt_cir_y.

$$Vtgt\_rel\_x = Vtgt\_x + Vego\_x + Vtgt\_cir\_x \tag{10}$$

$$Vtgt\_rel\_y = Vtgt\_y + Vego\_y + Vtgt\_cir\_y \tag{11}$$

The object relative speed X-component Vtgt_rel_x is an X-axis component of the moving speed of the detected object 200 of the current time tnow on the own vehicle coordinate system CS of the current time tnow. Thus, the object relative speed X-component Vtgt_rel_x is a relative speed of the detected object 200 of the current time tnow with respect to the own vehicle reference point 100R of the current time tnow in the width direction of the own vehicle 100.

The object relative speed Y-component Vtgt_rel_y is a Y-axis component of the moving speed of the detected object 200 of the current time tnow on the own vehicle coordinate system CS of the current time tnow. Thus, the object relative speed Y-component Vtgt_rel_y is a relative speed of the detected object 200 of the current time tnow with respect to the own vehicle reference point 100R of the current time tnow in the longitudinal direction of the own vehicle 100.

Then, the vehicle collision avoidance assist apparatus 10 acquires an object crossing angle θtgt by a calculation using a formula (12) described below, based on the acquired object relative speed X-component Vtgt_rel_x and the acquired object relative speed Y-component Vtgt_rel_y.

$$\theta tgt = a \tan 2(Vtgt\_rel\_x, Vtgt\_rel\_y) \tag{12}$$

The object crossing angle θtgt is an angle defined by a speed vector of the detected object 200 of the current time tnow and a speed vector of the own vehicle 100 of the current time tnow.

In addition, the vehicle collision avoidance assist apparatus 10 acquires an object relative speed Vtgt_rel by a calculation using a formula (13) described below, based on the acquired object relative speed X-component Vtgt_rel_x and the acquired object relative speed Y-component Vtgt_rel_y.

$$Vtgt\_rel = \sqrt{(Vtgt\_rel\_x^2 + Vtgt\_rel\_y^2)} \tag{13}$$

The object relative speed Vtgt_rel is a relative speed of the detected object 200 of the current time tnow on the own vehicle coordinate system CS of the current time tnow. Thus, the object relative speed Vtgt_rel is a relative speed of the detected object 200 of the current time tnow with respect to the own vehicle reference point 100R of the current time tnow.

<Predicted Turning Route>

Then, the vehicle collision avoidance assist apparatus 10 acquires a route along which the own vehicle 100 is predicted to move as a predicted turning route RTego. In particular, the vehicle collision avoidance assist apparatus 10 acquires a turning radius R by a calculation using a formula (14) described below, based on the own vehicle moving speed Vego of the current time tnow and the own vehicle yaw rate ω of the current time tnow. Then, the vehicle collision avoidance assist apparatus 10 acquires an X-coordinate of the own vehicle reference point 100R of each time t after the current time tnow as a predicted own vehicle X-coordinate Xego_cal by a calculation using a formula (15) described below, based on the acquired turning radius R and the own vehicle yaw rate ω of the current time tnow. In addition, the vehicle collision avoidance assist apparatus 10 acquires a Y-coordinate of the own vehicle reference point 100R of each time t after the current time tnow as a predicted own vehicle Y-coordinate Yego_cal by a calculation using a formula (16) described below, based on the acquired turning radius R and the own vehicle yaw rate ω of the current time tnow.

$$R = Vego / \omega \tag{14}$$

$$Xego\_cal = R - R \cdot \cos \omega t \tag{15}$$

$$Yego\_cal = R \cdot \sin \omega t \tag{16}$$

Each time t after the current time tnow is a time after an integral multiple of a predetermined time, i.e., a calculation cycle Δt from the current time tnow.

The predicted own vehicle X-coordinate Xego_cal is an X-coordinate of the own vehicle 100 of the time t after the current time tnow on the own vehicle coordinate system CS of the current time tnow. Thus, the predicted own vehicle X-coordinate Xego_cal represents the position of the own vehicle reference point 100R of the time t after the current time tnow in the width direction of the own vehicle 100 with respect to the own vehicle reference point 100R of the current time tnow.

The predicted own vehicle Y-coordinate Yego_cal is a Y-coordinate of the own vehicle 100 of the time t after the current time tnow on the own vehicle coordinate system CS of the current time tnow. Thus, the predicted own vehicle Y-coordinate Yego_cal represents the position of the own vehicle reference point 100R of the time t after the current time tnow in the longitudinal direction of the own vehicle 100 with respect to the own vehicle reference point 100R of the current time tnow.

The vehicle collision avoidance assist apparatus 10 acquires a line connecting coordinate points defined by the acquired predicted own vehicle X-coordinate Xego_cal and the acquired predicted own vehicle Y-coordinate Yego_cal as the predicted turning route RTego.

<Predicted Moving Route>

In addition, the vehicle collision avoidance assist apparatus 10 acquires a route along which the detected object 200 is predicted to move as a predicted moving route RTtgt. In particular, the vehicle collision avoidance assist apparatus 10 acquires an X-coordinate of the detected object 200 of each time t after the current time tnow as a predicted object X-coordinate Xtgt_cal by a calculation using a formula (17) described below, based on the object ground speed Vtgt of the current time tnow, the object crossing angle θtgt of the current time tnow, and the object X-coordinate Xtgt of the current time tnow. In addition, the vehicle collision avoidance assist apparatus 10 acquires a Y-coordinate of the detected object 200 of each time t after the current time tnow as a predicted object Y-coordinate Ytgt_cal by a calculation using a formula (18) described below, based on the object ground speed Vtgt of the current time tnow, the object crossing angle θtgt of the current time tnow, and the object Y-coordinate Ytgt of the current time tnow.

$$Xtgt\_cal = Vtgt \cdot t \cdot \sin\theta + Xtgt \quad (17)$$

$$Ytgt\_cal = Vtgt \cdot t \cdot \cos\theta + Ytgt \quad (18)$$

The predicted object X-coordinate Xtgt_cal is an X-coordinate of the detected object 200 of the time t after the current time tnow on the own vehicle coordinate system CS of the current time tnow. Thus, the predicted object X-coordinate Xtgt_cal represents the position of the detected object 200 of the time t after the current time tnow in the width direction of the own vehicle 100 with respect to the own vehicle reference point 100R of the current time tnow.

The predicted object Y-coordinate Ytgt_cal is a Y-coordinate of the detected object 200 of the time t after the current time tnow on the own vehicle coordinate system CS of the current time tnow. Thus, the predicted object X-coordinate Xtgt_cal represents the position of the detected object 200 of the time t after the current time tnow in the longitudinal direction of the own vehicle 100 with respect to the own vehicle reference point 100R of the current time tnow.

The vehicle collision avoidance assist apparatus 10 acquires a line connecting coordinate points defined by the acquired predicted object X-coordinate Xtgt_cal and the acquired predicted object Y-coordinate Ytgt_cal as the predicted moving route RTtgt.

When the predicted turning route RTego crosses the predicted moving route RTtgt on the own vehicle coordinate system CS of the current time tnow, the vehicle collision avoidance assist apparatus 10 determines whether the own vehicle 100 is going to collide with the detected object 200 by executing processes described below.

That is, the vehicle collision avoidance assist apparatus 10 calculates and acquires a predicted reaching time TTC. The predicted reaching time TTC is a time taken for the own vehicle reference point 100R to reach the predicted moving route RTtgt assuming that the own vehicle 100 moves, keeping its moving state of the current time tnow. For example, the vehicle collision avoidance assist apparatus 10 calculates the predicted reaching time TTC by dividing a distance which the own vehicle 100 moves to the predicted moving route RTtgt by the own vehicle moving speed Vego of the current time tnow.

Then, the vehicle collision avoidance assist apparatus 10 determines whether the acquired predicted reaching time TTC is smaller than a predetermined predicted reaching time TTCth.

When the predicted reaching time TTC becomes smaller than the predetermined predicted reaching time TTCth, the vehicle collision avoidance assist apparatus 10 acquires an X-axis direction object distance dtgt_x and a Y-axis direction object distance dtgt_y of each time t after the current time tnow by a calculation using formulas (19) and (20) described below, based on the object relative speed Vtgt_rel, the object crossing angle θtgt, the object X-coordinate Xtgt, the object Y-coordinate Ytgt, the turning radius R, and the own vehicle yaw rate ω of the current time tnow.

$$dtgt\_x = (Vtgt \cdot t \cdot \sin\theta + Xtgt - (R - R \cdot \cos\omega t)) \cdot \cos\omega t - (Vtgt \cdot t \cdot \cos\theta + Ytgt - R \cdot \sin\omega t) \cdot \sin\omega t \quad (19)$$

$$dtgt\_y = (Vtgt \cdot t \cdot \sin\theta + Xtgt - (R - R \cdot \cos\omega t)) \cdot \sin\omega t + (Vtgt \cdot t \cdot \cos\theta + Ytgt - R \cdot \sin\omega t) \cdot \cos\omega t \quad (20)$$

The X-axis direction object distance dtgt_x is a distance in the X-axis direction between the detected object 200 of the time t and the own vehicle reference point 100R of the time t on the own vehicle coordinate system CS of the time t. Thus, the X-axis direction object distance dtgt_x represents a distance in the width direction of the own vehicle 100 between the detected object 200 of the time t and the own vehicle reference point 100R of the time t.

The Y-axis direction object distance dtgt_y is a distance in the Y-axis direction between the detected object 200 of the time t and the own vehicle reference point 100R of the time t on the own vehicle coordinate system CS of the time t. Thus, the Y-axis direction object distance dtgt_y represents a distance in the longitudinal direction of the own vehicle 100 between the detected object 200 of the time t and the own vehicle reference point 100R of the time t.

Figure 5:
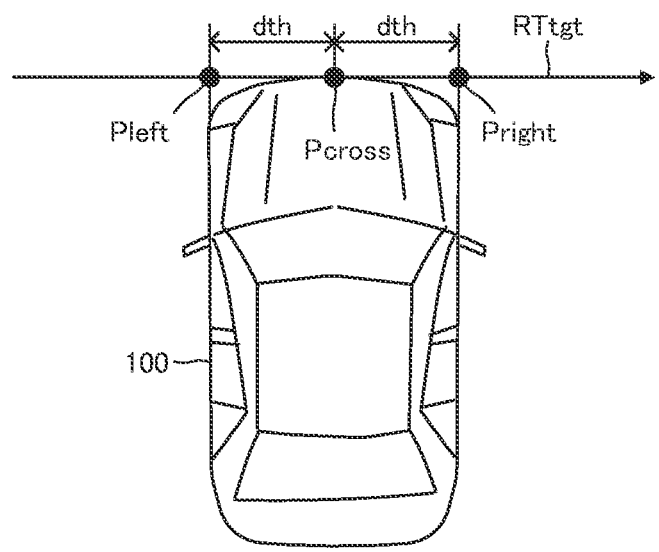
FIG. 5 is a view which shows a collision area.

Then, the vehicle collision avoidance assist apparatus 10 predicts an object position corresponding to a position of the detected object 200 at the time when the own vehicle reference point 100R reaches a crossing point Pcross where the predicted turning route RTego crosses the predicted moving route RTtgt. In other words, the vehicle collision avoidance assist apparatus 10 predicts the position of the detected object 200 with respect to the own vehicle reference point 100R at the time when the own vehicle reference point 100R reaches the predicted moving route RTtgt. Then, the vehicle collision avoidance assist apparatus 10 determines whether the predicted position of the detected object 200 is in a collision area RGcol. As shown in FIG. 5, the collision area RGcol is an area between a point Pleft and a point right. The point Pleft is a point separated from the crossing point Pcross by a predetermined distance dth in one direction along the predicted moving route RTtgt. The point Pright is a point separated from the crossing point Pcross by the predetermined distance dth in the other direction along the predicted moving route RTtgt. Further, the predetermined distance dth corresponds to one half of a width of the own vehicle 100.

In this embodiment, the vehicle collision avoidance assist apparatus 10 determines whether the predicted position of the detected object 200 is in the collision area RGcol by determining whether the X-axis direction object distance dtgt_x is equal to or smaller than the predetermined distance dth at the time t when the Y-axis direction object distance dtgt_y decreases to zero.

When the position of the detected object 200 is in the collision area RGcol, the vehicle collision avoidance assist apparatus 10 determines that the own vehicle 100 is going to collide with the detected object 200, and thus the collision condition C2 becomes satisfied. In this embodiment, when the X-axis direction object distance dtgt_x is equal to or smaller than the predetermined distance dth at the time t when the Y-axis direction object distance dtgt_y decreases to zero, the vehicle collision avoidance assist apparatus 10 determines that the own vehicle 100 is going to collide with the detected object 200.

When the X-axis direction object distance dtgt_x is equal to or smaller than the predetermined distance dth at the time t when the Y-axis direction object distance dtgt_y decreases to zero, the vehicle collision avoidance assist apparatus 10 determines that the collision condition C2 becomes satisfied. That is, when the predicted reaching time TTC is equal to or smaller than the predetermined predicted reaching time TTCth, and the X-axis direction object distance dtgt_x is equal to or smaller than the predetermined distance dth at the time t when the Y-axis direction object distance dtgt_y decreases to zero, the vehicle collision avoidance assist apparatus 10 determines that the collision condition C2 becomes satisfied. When the vehicle collision avoidance assist apparatus 10 determines that the collision condition C2 becomes satisfied, the vehicle collision avoidance assist apparatus 10 starts to execute the collision avoidance control as far as a collision avoidance forbiddance condition C3 is not satisfied.

While the vehicle collision avoidance assist apparatus 10 executes the collision avoidance control, the vehicle collision avoidance assist apparatus 10 controls the operations of the driving apparatus 21 so as to make the driving force applied to the own vehicle 100 zero and controls the operations of the braking apparatus 22 so as to apply the driving force corresponding to a predetermined driving force to the own vehicle 100. The predetermined braking force is set to a value which can stop the own vehicle 100 before the predicted moving route RTtgt.

<Collision Avoidance Forbiddance Condition>

Figure 6:
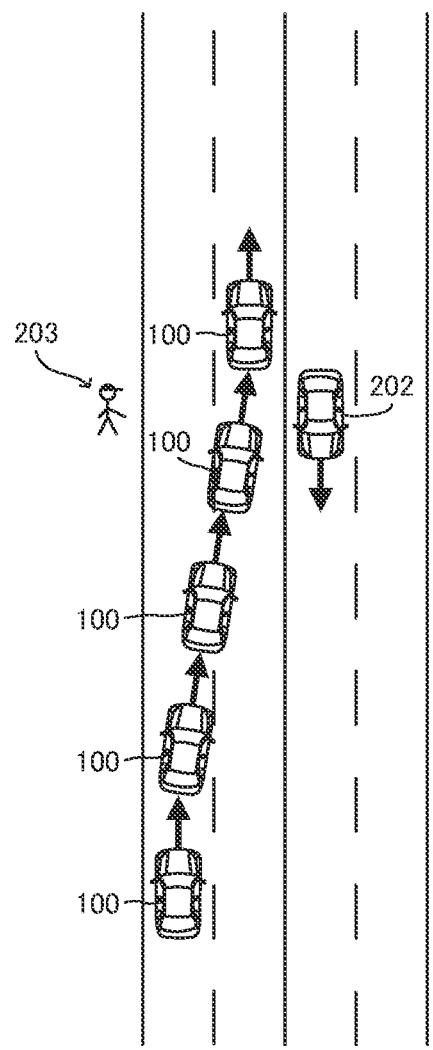
FIG. 6 is a view which shows a scene that the own vehicle changes traffic lanes to a right traffic lane.

As shown in FIG. 6, when the driver DR drives the own vehicle 100 to change traffic lanes to a right traffic lane, the steering wheel 35 is turned. Thus, the own vehicle turning condition C1 becomes satisfied. If the vehicle collision avoidance assist apparatus 10 executes the collision determination process in such a situation, and there is an oncoming vehicle 202 immediately ahead of the own vehicle 100 while the own vehicle 100 changes the traffic lanes, the collision condition C2 may become satisfied for the oncoming vehicle 202, and the collision avoidance control may be executed. However, eventually, the own vehicle 100 moves along the traffic lane which the own vehicle 100 changing the traffic lanes reaches. Thus, the own vehicle 100 does not collide with the oncoming vehicle 202. Thus, an execution of the collision avoidance control in such a situation is unnecessary.

Figure 7:
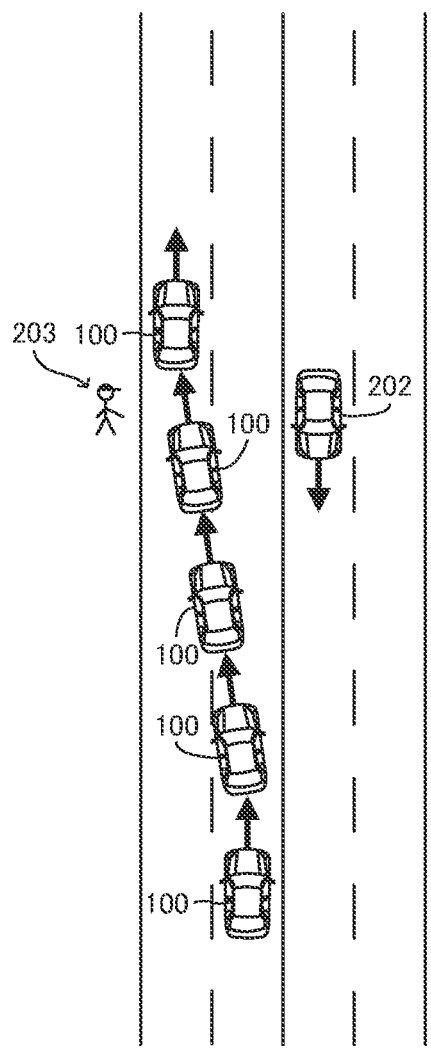
FIG. 7 is a view which shows a scene that the own vehicle changes traffic lanes to a left traffic lane.

Similarly, as shown in FIG. 7, when the driver DR drives the own vehicle 100 to change the traffic lanes to a left traffic lane, the steering wheel 35 is turned. Thus, the own vehicle turning condition C1 becomes satisfied. If the vehicle collision avoidance assist apparatus 10 executes the collision determination process in such a situation, and there is a person 203 immediately ahead of the own vehicle 100 while the own vehicle 100 changes the traffic lanes, the collision condition C2 may become satisfied for the oncoming vehicle 202, and the collision avoidance control may be executed. However, eventually, the own vehicle 100 moves along the traffic lane which the own vehicle 100 changing the traffic lanes reaches. Thus, the own vehicle 100 does not collide with the person 203. Thus, the execution of the collision avoidance control in such a situation is unnecessary.

Figure 8:
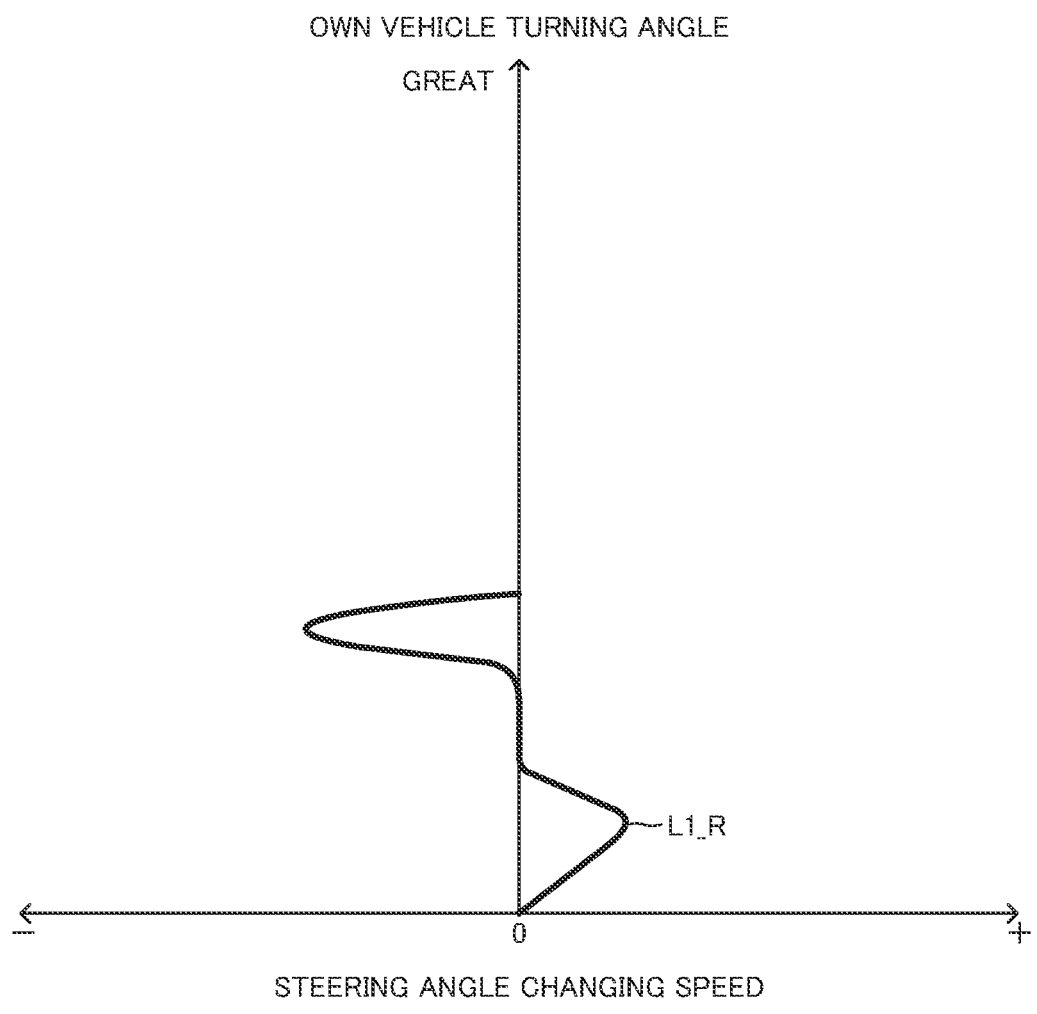
FIG. 8 is a view which shows a change of a steering angle changing speed when the own vehicle changes the traffic lanes to the right traffic lane.

When the driver DR drives the own vehicle 100 to change the traffic lanes to the right traffic lane, the driver DR turns the steering wheel 35 clockwise and holds the steering wheel 35 for a while. Then, the driver DR turns the steering wheel 35 counterclockwise. That is, the driver DR carries out a reversed steering operation to complete driving the own vehicle 100 to change the traffic lanes. Thus, as shown in FIG. 8, when the horizontal axis shows the steering angle changing speed dθ, and the vertical axis shows the own vehicle turning angle θego, the steering angle changing speed dθ changes along a line L1_R shown in FIG. 8. It should be noted that the steering angle changing speed dθ corresponds to a changing amount per unit time of the steered angle of the own vehicle 100. In an example shown in FIG. 8, the steering angle changing speed dθ takes a positive value when the steering wheel 35 is turned clockwise. On the other hand, the steering angle changing speed dθ takes a negative value when the steering wheel 35 is turned counterclockwise. Thus, the steering angle changing speed dθ is a parameter representing a steered state of the own vehicle 100 and including a positive or negative sign. Further, the own vehicle turning angle θego is a total angle which the own vehicle 100 has turned about a turning center from when the own vehicle 100 starts turning.

As can be understood from FIG. 8, when the driver DR drives the own vehicle 100 to change the traffic lanes to the right traffic lane, the steering angle changing speed dθ increases on a positive side and then, decreases to zero. Then, the steering angle changing speed dθ is kept zero for a while. Then, an absolute value of the steering angle changing speed dθ increases on a negative side and then, decreases to zero.

Figure 9:
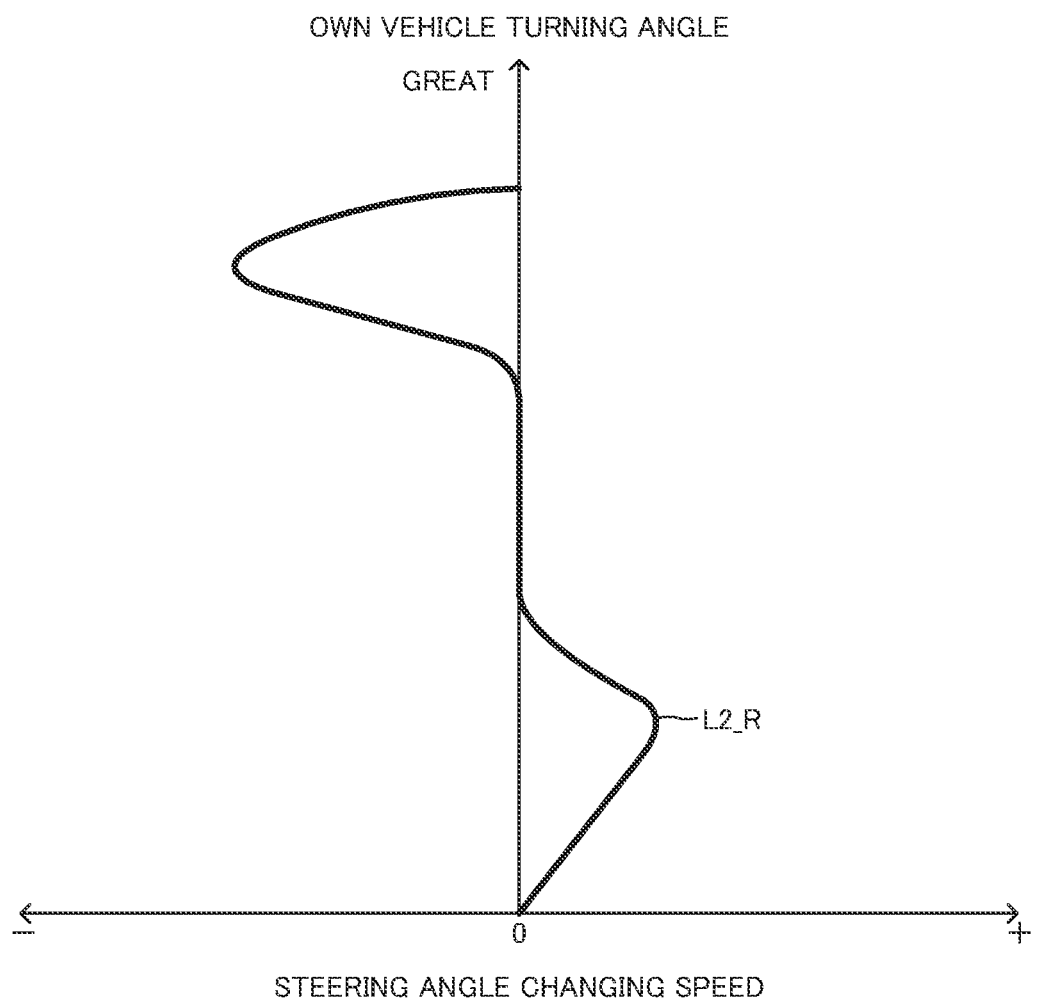
FIG. 9 is a view which shows the change of the steering angle changing speed when the own vehicle turns right.

When the driver DR turns the own vehicle 100 right, the driver DR turns the steering wheel 35 clockwise and holds the steering wheel 35 for a while. Then, the driver DR turns the steering wheel 35 counterclockwise. That is, the driver DR carries out the reversed steering operation to complete turning the own vehicle 100 right. Thus, when the driver DR turns the own vehicle 100 right, the steering angle changing speed dθ changes along a line L2_R shown in FIG. 9. Thus, when the driver DR turns the own vehicle 100 right, the steering angle changing speed dθ increases on the positive side and then, decreases to zero. Then, the steering angle changing speed dθ is kept zero for a while. Then, the absolute value of the steering angle changing speed dθ increases on the negative side and then, decreases to zero.

As can be understood from description above, both in a scene that the driver DR drives the own vehicle 100 to change the traffic lanes to the right traffic lane and in a scene that the driver DR turns the own vehicle 100 right, the steering angle changing speed dθ increases on the positive side and then, decreases to zero. Then, the steering angle changing speed dθ is kept zero for a while. Then, the absolute value of the steering angle changing speed dθ increases on the negative side and then, decreases to zero. However, as shown in FIG. 10, the own vehicle turning angle θego when the steering angle changing speed dθ takes the negative value in the scene that the driver DR drives the own vehicle 100 to change the traffic lanes to the right traffic lane, is smaller than the own vehicle turning angle θego when the steering angle changing speed dθ takes the negative value in the scene that the driver DR turns the own vehicle 100 right.

Figure 10:
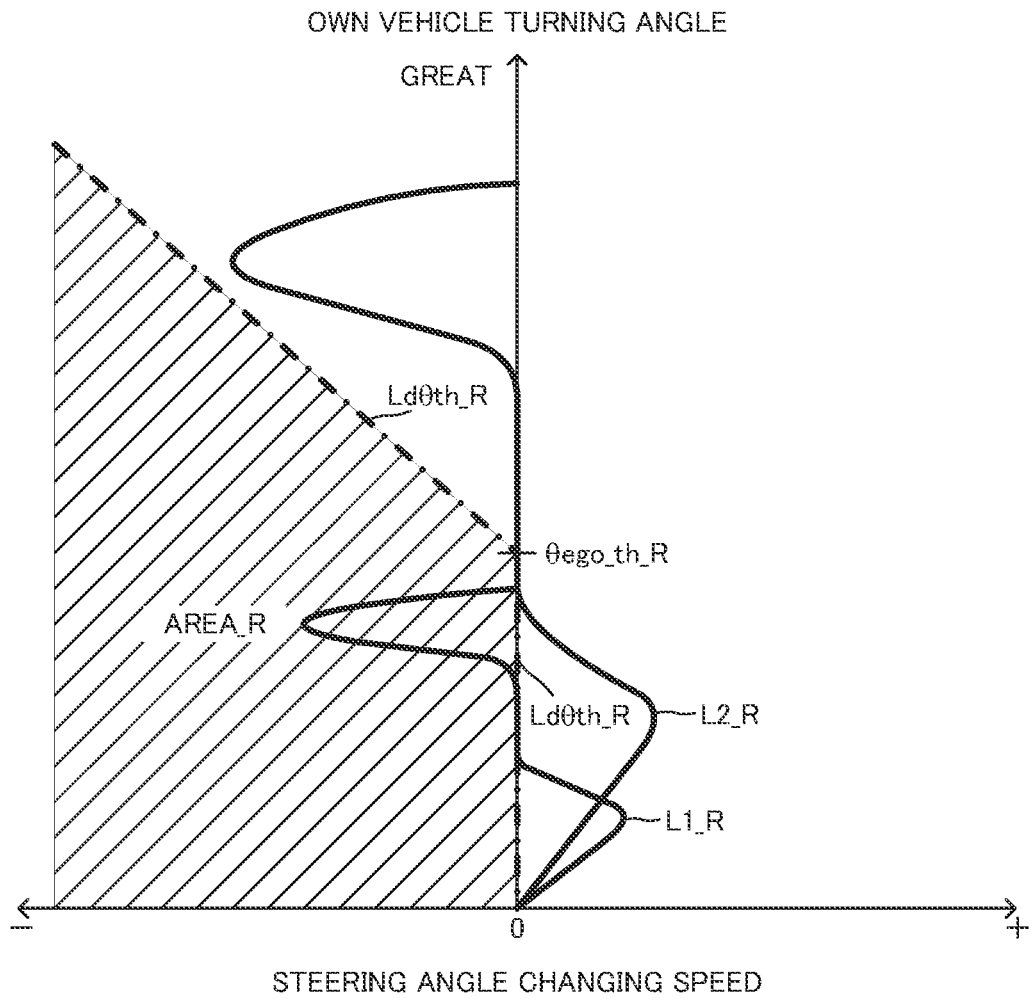
FIG. 10 is a view which shows a steering angle changing speed threshold when the own vehicle starts to turn with a right turn.

Thus, if the collision avoidance control is kept stopped when the steering angle changing speed dθ is in an area shown by a reference symbol AREA_R in FIG. 10 until the own vehicle 100 completes turning after the own vehicle 100 starts to be oriented rightward, the unnecessary execution of the collision avoidance control can be avoided at least in the latter half of changing the traffic lanes when the driver DR drives the own vehicle 100 to change the traffic lanes to the right traffic lane.

Figure 11:
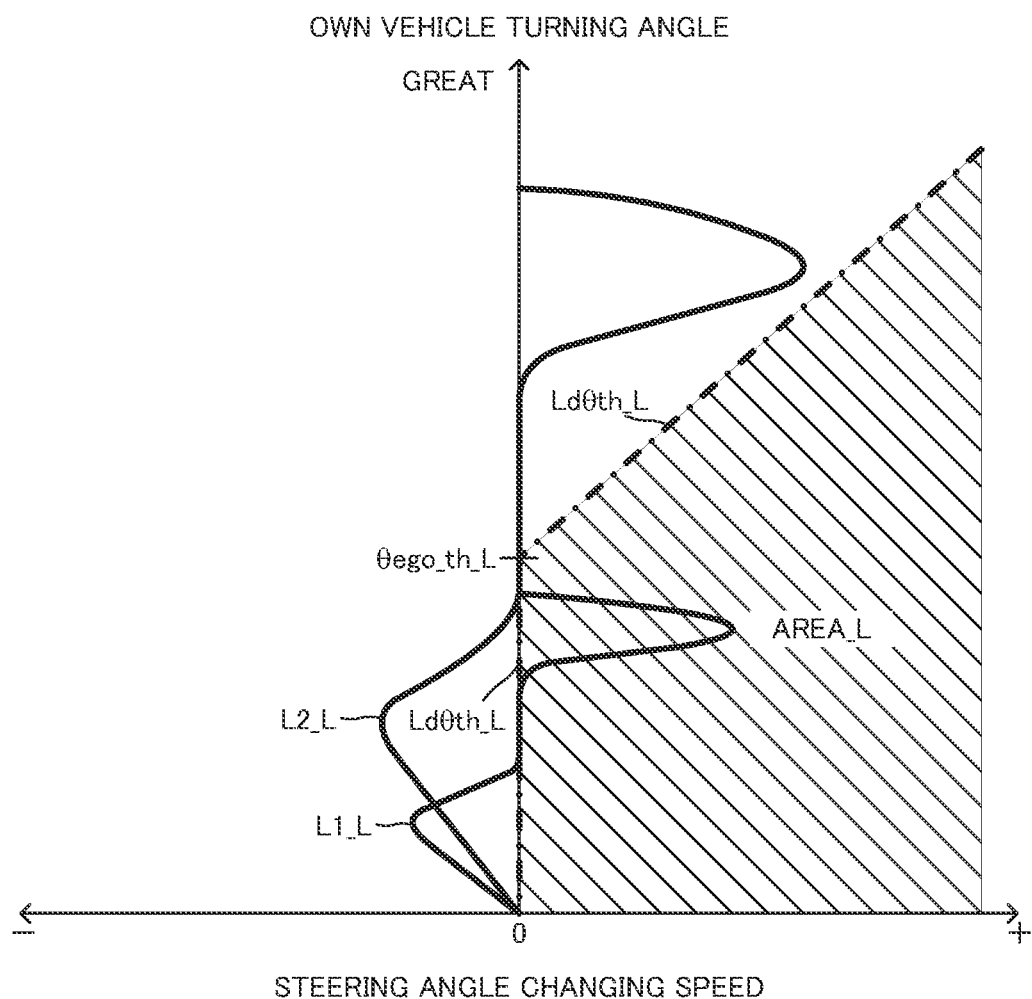
FIG. 11 is a view which shows the steering angle changing speed threshold when the own vehicle starts to turn with a left turn.

Similarly, if the collision avoidance control is kept stopped when the steering angle changing speed dθ is in an area shown by a reference symbol AREA_L in FIG. 11 until the own vehicle 100 completes turning after the own vehicle 100 starts to be oriented leftward, the unnecessary execution of the collision avoidance control can be avoided at least in the latter half of changing the traffic lanes when the driver DR drives the own vehicle 100 to change the traffic lanes to the left traffic lane.

Accordingly, the vehicle collision avoidance assist apparatus 10 acquires the steering angle changing speed dθ as the steered state of the own vehicle 100, based on the steering angle θ when the own vehicle turning condition C1 becomes satisfied. The vehicle collision avoidance assist apparatus 10 acquires the positive steering angle changing speed dθ when the steering wheel 35 is turned clockwise. On the other hand, the vehicle collision avoidance assist apparatus 10 acquires the negative steering angle changing speed dθ when the steering wheel 35 is turned counterclockwise. It should be noted that the steering angle changing speed dθ which the vehicle collision avoidance assist apparatus 10 acquires, is zero when the steering wheel 35 is held.

<Rightward Moving>

When the steering wheel 35 is turned clockwise at a point of time when the own vehicle turning condition C1 becomes satisfied, the vehicle collision avoidance assist apparatus 10 determines whether the steering angle changing speed dθ is equal to or smaller than a predetermined value, i.e., a right turn steering angle changing speed threshold dθth_R while the own vehicle turning condition C1 is satisfied, i.e., the own vehicle 100 moves rightward. In addition, while the own vehicle turning condition C1 is satisfied, i.e., the own vehicle 100 moves rightward, the vehicle collision avoidance assist apparatus 10 changes the right turn steering angle changing speed threshold dθth_R, depending on the own vehicle turning angle θego.

In particular, the vehicle collision avoidance assist apparatus 10 calculates the own vehicle turning angle θego, using a formula (21) described below, based on the own vehicle yaw rate ω and the calculation cycle Δt.

$$\theta ego = \Sigma \omega \cdot \Delta t \quad (21)$$

It should be noted that the vehicle collision avoidance assist apparatus 10 may be configured to acquire a unit moving distance L, i.e., a distance which the own vehicle 100 moves during the calculation cycle Δt by a calculation using a formula (22) described below, based on the own vehicle moving speed Vego, the calculation cycle Δt, and an acceleration a of the own vehicle 100 and acquire the own vehicle turning angle θego by a calculation using a formula (23) described below, based on the unit moving distance L and the turning radius R.

$$L = Vego \cdot \Delta t - (a \cdot \Delta t)^2 / 2 \quad (22)$$

$$\theta ego = \Sigma L / R \quad (23)$$

Then, the vehicle collision avoidance assist apparatus 10 sets the right turn steering angle changing speed dθth_R as shown by a line Ldθth_R in FIG. 10. That is, the vehicle collision avoidance assist apparatus 10 sets the right turn steering angle changing speed dθth_R to zero until the own vehicle steering angle θego becomes a predetermined angle, i.e., a right turning angle threshold θego_th_R.

The right turning angle threshold θego_th_R is a value of the own vehicle turning angle θego which distinguishes the reversed steering operation to the own vehicle 100 for turning the own vehicle 100 right from the reversed steering operation to the own vehicle 100 for driving the own vehicle 100 to change the traffic lanes to the right traffic lane. That is, the right turning angle threshold θego_th_R is a value between (i) the own vehicle turning angle θego when the steering angle changing speed dθ becomes negative while the own vehicle 100 is driven to change the traffic lanes to the right traffic lane and (ii) the own vehicle turning angle θego when the steering angle changing speed dθ becomes negative while the own vehicle 100 is driven to turn right. The right turning angle threshold θego_th_R is set, based on various data.

Then, the vehicle collision avoidance assist apparatus 10 sets the right turn steering angle changing speed threshold dθth_R to a value which decreases as the own vehicle turning angle θego increases after the own vehicle steering angle θego reaches the right turning angle threshold θego_th_R. That is, the vehicle collision avoidance assist apparatus 10 sets the right turn steering angle changing speed threshold dθth_R to a negative value of which the absolute value increases as the own vehicle turning angle θego increases after the own vehicle steering angle θego reaches the right turning angle threshold θego_th_R.

Then, when the steering angle changing speed dθ is equal to or smaller than the right turn steering angle changing speed threshold dθth_R, the vehicle collision avoidance assist apparatus 10 determines that the collision avoidance forbiddance condition C3 is satisfied.

When the reversed steering operation is carried out to the own vehicle 100 while the own vehicle 100 is driven to change the traffic lanes to the right traffic lane, the steering angle changing speed dθ takes a negative value. With the vehicle collision avoidance assist apparatus 10, the right turn steering angle changing speed threshold dθth_R is set to zero until the own vehicle turning angle θego reaches the right turning angle threshold θego_th_R, i.e., a predetermined own vehicle turning angle threshold. Then, after the own vehicle turning angle θego reaches the right turning angle threshold θego_th_R, i.e., the predetermined own vehicle turning angle threshold, the right turn steering angle changing speed threshold dθth_R is set to a value which decreases as the own vehicle turning angle θego increases. Also, the right turn steering angle changing speed threshold dθth_R is set to a value which distinguishes the reversed steering operation to the own vehicle 100 for turning the own vehicle 100 right from the reversed steering operation to the own vehicle 100 for driving the own vehicle 100 to change the traffic lanes to the right traffic lane. That is, the right turn steering angle changing speed dθth_R is set to a value between (i) the own vehicle turning angle θego when the steering angle changing speed dθ becomes negative while the own vehicle 100 is driven to change the traffic lanes to the right traffic lane and (ii) the own vehicle turning angle θego when the steering angle changing speed dθ becomes negative while the own vehicle 100 is driven to turn right. Then, when the steering angle changing speed dθ is equal to or smaller than the right turn steering angle changing speed threshold $d\theta th\_R$ set described above, the collision avoidance forbiddance condition C3 is determined to be satisfied. Thus, the collision avoidance forbiddance condition C3 is a condition which becomes satisfied in response to the reversed steering operation being carried out to the own vehicle 100 when the own vehicle turning angle $\theta ego$ is equal to or smaller than the predetermined own vehicle turning angle threshold $\theta ego\_th$ after the own vehicle 100 starts to move rightward.

When the collision avoidance forbiddance condition C3 is satisfied, and the collision condition C2 is even satisfied, the vehicle collision avoidance assist apparatus 10 does not execute the collision avoidance control. When the collision avoidance forbiddance condition C3 is not satisfied, and the collision condition C2 is satisfied, the vehicle collision avoidance assist apparatus 10 executes the collision avoidance control.

It should be noted that the vehicle collision avoidance assist apparatus 10 determines that the steering angle changing speed $d\theta$ is smaller than the right turn steering angle changing speed threshold $d\theta th\_R$ when the right turn steering angle changing speed threshold $d\theta th\_R$ is set to a positive value, and the steering angle changing speed $d\theta$ is negative. Also, the vehicle collision avoidance assist apparatus 10 determines that the steering angle changing speed $d\theta$ is smaller than the right turn steering angle changing speed threshold $d\theta th\_R$ when the right turn steering angle changing speed threshold $d\theta th\_R$ is set to zero, and the steering angle changing speed $d\theta$ is negative. Also, the vehicle collision avoidance assist apparatus 10 determines that the steering angle changing speed $d\theta$ is smaller than the right turn steering angle changing speed threshold $d\theta th\_R$ when (i) the right turn steering angle changing speed threshold $d\theta th\_R$ is set to a negative value, (ii) the steering angle changing speed $d\theta$ is negative, and (iii) the absolute value of the steering angle changing speed $d\theta$ is greater than the absolute value of the right turn steering angle changing speed threshold $d\theta th\_R$. Thus, the vehicle collision avoidance assist apparatus 10 determines that the steering angle changing speed $d\theta$ is greater than the right turn steering angle changing speed threshold $d\theta th\_R$ when (i) the right turn steering angle changing speed threshold $d\theta th\_R$ is set to a negative value, (ii) the steering angle changing speed $d\theta$ is negative, and (iii) the absolute value of the steering angle changing speed $d\theta$ is smaller than the absolute value of the right turn steering angle changing speed threshold $d\theta th\_R$. Also, the vehicle collision avoidance assist apparatus 10 determines that the steering angle changing speed $d\theta$ is greater than the right turn steering angle changing speed threshold $d\theta th\_R$ when the right turn steering angle changing speed threshold $d\theta th\_R$ is set to a negative value, and the steering angle changing speed $d\theta$ is positive.

<Leftward Moving>

On the other hand, when the steering wheel 35 is turned counterclockwise at a point of time when the own vehicle turning condition C1 becomes satisfied, the vehicle collision avoidance assist apparatus 10 determines whether the steering angle changing speed $d\theta$ is equal to or greater than a predetermined value, i.e., a left turn steering angle changing speed threshold $d\theta th\_L$ while the own vehicle turning condition C1 is satisfied, i.e., the own vehicle 100 moves leftward. In addition, while the own vehicle turning condition C1 is satisfied, i.e., the own vehicle 100 moves leftward, the vehicle collision avoidance assist apparatus 10 changes the left turn steering angle changing speed threshold $d\theta th\_L$, depending on the own vehicle turning angle $\theta ego$.

In particular, the vehicle collision avoidance assist apparatus 10 calculates the own vehicle turning angle $\theta ego$, using the formula (21) described above, based on the own vehicle yaw rate $\omega$ and the calculation cycle $\Delta t$.

Then, the vehicle collision avoidance assist apparatus 10 sets the left turn steering angle changing speed $d\theta th\_L$ as shown by a ling $Ld\theta th\_L$ in FIG. 11. That is, the vehicle collision avoidance assist apparatus 10 sets the left turn steering angle changing speed $d\theta th\_L$ to zero until the own vehicle steering angle $\theta ego$ becomes a predetermined angle, i.e., a left turning angle threshold $\theta ego\_th\_R$.

The left turning angle threshold $\theta ego\_th\_L$ is a value of the own vehicle turning angle $\theta ego$ which distinguishes the reversed steering operation to the own vehicle 100 for turning the own vehicle 100 left from the reversed steering operation to the own vehicle 100 for driving the own vehicle 100 to change the traffic lanes to the left traffic lane. That is, the left turning angle threshold $\theta ego\_th\_L$ is a value between (i) the own vehicle turning angle $\theta ego$ when the steering angle changing speed $d\theta$ becomes positive while the own vehicle 100 is driven to change the traffic lanes to the left traffic lane and (ii) the own vehicle turning angle $\theta ego$ when the steering angle changing speed $d\theta$ becomes positive while the own vehicle 100 is driven to turn left. The left turning angle threshold $\theta ego\_th\_R$ is set, based on various data.

Then, the vehicle collision avoidance assist apparatus 10 sets the left turn steering angle changing speed threshold $d\theta th\_L$ to a value which increases as the own vehicle turning angle $\theta ego$ increases after the own vehicle steering angle $\theta ego$ reaches the left turning angle threshold $\theta ego\_th\_L$. That is, the vehicle collision avoidance assist apparatus 10 sets the left turn steering angle changing speed threshold $d\theta th\_L$ to a positive value of which the absolute value increases as the own vehicle turning angle $\theta ego$ increases after the own vehicle turning angle $\theta ego$ reaches the left turning angle threshold $\theta ego\_th\_L$.

Then, when the steering angle changing speed $d\theta$ is equal to or greater than the left turn steering angle changing speed threshold $d\theta th\_L$, the vehicle collision avoidance assist apparatus 10 determines that the collision avoidance forbiddance condition C3 is satisfied.

When the reversed steering operation is carried out to the own vehicle 100 while the own vehicle 100 is driven to change the traffic lanes to the left traffic lane, the steering angle changing speed $d\theta$ takes a positive value. With the vehicle collision avoidance assist apparatus 10, the left turn steering angle changing speed threshold $d\theta th\_R$ is set to zero until the own vehicle turning angle $\theta ego$ reaches the left turning angle threshold $\theta ego\_th\_R$, i.e., the predetermined own vehicle turning angle threshold. Then, after the own vehicle turning angle $\theta ego$ reaches the left turning angle threshold $\theta ego\_th\_L$, i.e., the predetermined own vehicle turning angle threshold, the left turn steering angle changing speed threshold $d\theta th\_R$ is set to a value which increases as the own vehicle turning angle $\theta ego$ increases. Also, the left turn steering angle changing speed threshold $d\theta th\_L$ is set to a value which distinguishes the reversed steering operation to the own vehicle 100 for turning the own vehicle 100 left from the reversed steering operation to the own vehicle 100 for driving the own vehicle 100 to change the traffic lanes to the left traffic lane. That is, the left turn steering angle changing speed threshold $d\theta th\_L$ is set to a value between (i) the own vehicle turning angle $\theta ego$ when the steering angle changing speed $d\theta$ becomes positive while the own vehicle 100 is driven to change the traffic lanes to the left traffic lane and (ii) the own vehicle turning angle $\theta ego$ when the steering angle changing speed dθ becomes positive while the own vehicle 100 is driven to turn left. Then, when the steering angle changing speed dθ is equal to or greater than the left turn steering angle changing speed threshold dθth_L set described above, the collision avoidance forbiddance condition C3 is determined to be satisfied. Thus, the collision avoidance forbiddance condition C3 is a condition which becomes satisfied in response to the reversed steering operation being carried out to the own vehicle 100 when the own vehicle turning angle θego is equal to or smaller than the predetermined own vehicle turning angle threshold θego_th after the own vehicle 100 starts to move leftward.

When the collision avoidance forbiddance condition C3 is satisfied, and the collision condition C2 is even satisfied, the vehicle collision avoidance assist apparatus 10 does not execute the collision avoidance control. When the collision avoidance forbiddance condition C3 is not satisfied, and the collision condition C2 is satisfied, the vehicle collision avoidance assist apparatus 10 executes the collision avoidance control.

It should be noted that the vehicle collision avoidance assist apparatus 10 determines that the steering angle changing speed dθ is smaller than the left turn steering angle changing speed threshold dθth_L when the left turn steering angle changing speed threshold dθth_L is set to a positive value, and the steering angle changing speed dθ is negative. Also, the vehicle collision avoidance assist apparatus 10 determines that the steering angle changing speed dθ is smaller than the left turn steering angle changing speed threshold dθth_L when the left turn steering angle changing speed threshold dθth_L is set to zero, and the steering angle changing speed dθ is negative.

Modified Example 1

Figure 12:
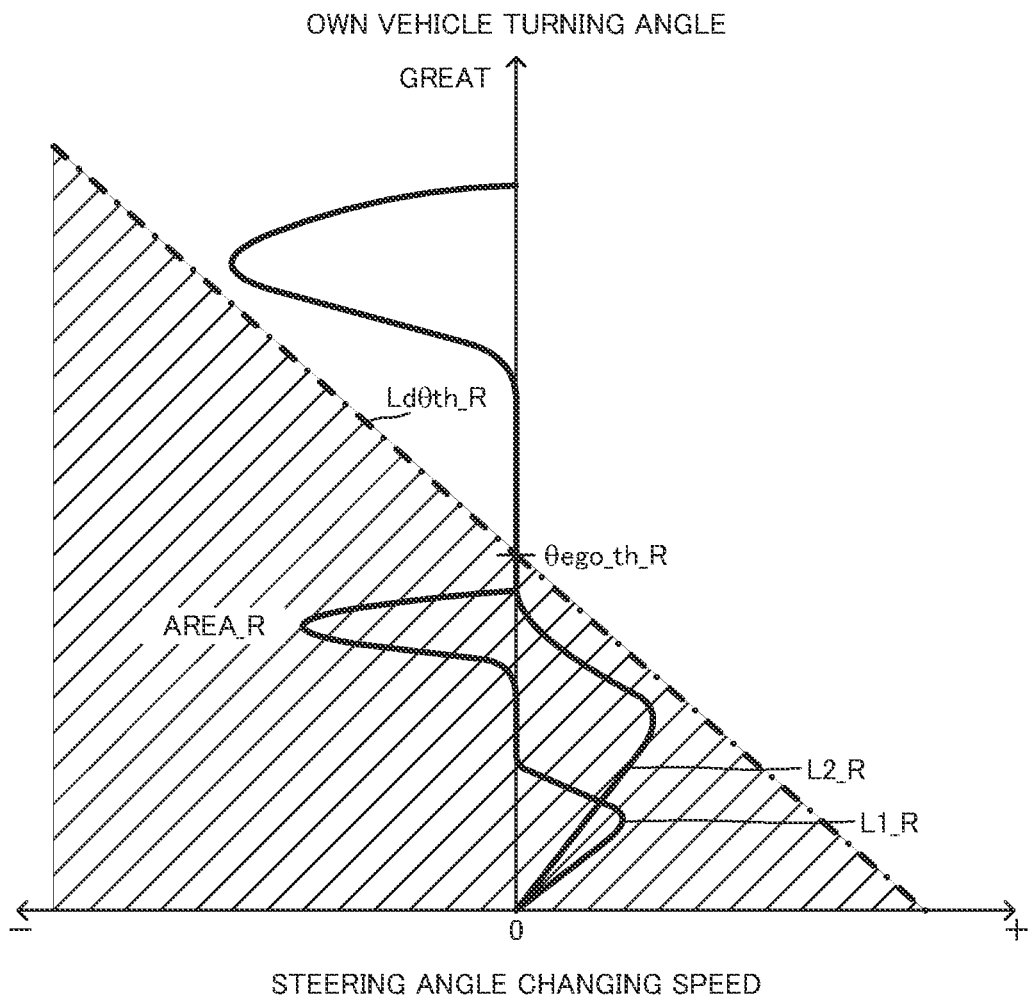
FIG. 12 is a view which shows the steering angle changing speed threshold which can be used when the own vehicle starts to turn with the right turn.

It should be noted that the right turn steering angle changing speed threshold dθth_R may be set as shown by a line Ldθth_R in FIG. 12. In this case, the vehicle collision avoidance assist apparatus 10 sets the right turn steering angle changing speed threshold dθth_R to a value which decreases as the own vehicle turning angle θego increases. That is, the vehicle collision avoidance assist apparatus 10 sets the right turn steering angle changing speed threshold dθth_R to a positive value of which the absolute value decreases as the own vehicle turning angle θego increases until the own vehicle turning angle θego reaches the right turning angle threshold θego_th_R. Then, the vehicle collision avoidance assist apparatus 10 sets the right turn steering angle changing speed threshold dθth_R to zero when the own vehicle turning angle θego corresponds to the right turning angle threshold θego_th_R. Then, the vehicle collision avoidance assist apparatus 10 sets the right turn steering angle changing speed threshold dθth_R to a negative value of which the absolute value increases as the own vehicle steering angle θego increases after the own vehicle turning angle θego reaches the right turning angle threshold θego_th_R.

Figure 13:
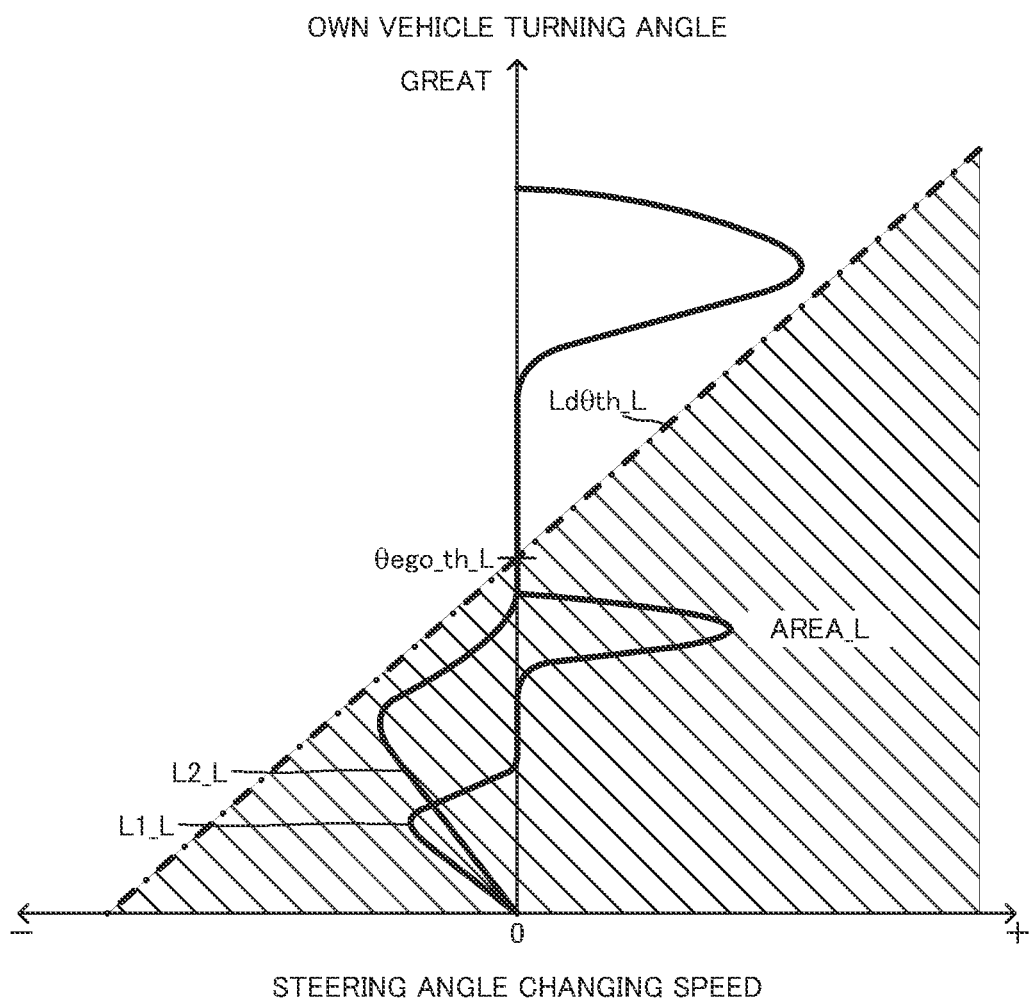
FIG. 13 is a view which shows the steering angle changing speed threshold which can be used when the own vehicle starts to turn with the left turn.

Similarly, the left turn steering angle changing speed threshold dθth_L may be set as shown by a line Ldθth_L in FIG. 13. In this case, the vehicle collision avoidance assist apparatus 10 sets the left turn steering angle changing speed threshold dθth_L to a value which increases as the own vehicle turning angle θego increases. That is, the vehicle collision avoidance assist apparatus 10 sets the left turn steering angle changing speed threshold dθth_L to a negative value of which the absolute value decreases as the own vehicle turning angle θego increases until the own vehicle turning angle θego reaches the left turning angle threshold θego_th_L. Then, the vehicle collision avoidance assist apparatus 10 sets the left turn steering angle changing speed threshold dθth_L to zero when the own vehicle turning angle θego corresponds to the left turning angle threshold θego_th_L. Then, the vehicle collision avoidance assist apparatus 10 sets the left turn steering angle changing speed threshold dθth_L to a positive value of which the absolute value increases as the own vehicle steering angle θego increases after the own vehicle turning angle θego reaches the left turning angle threshold θego_th_L.

Modified Example 2

Figure 14:
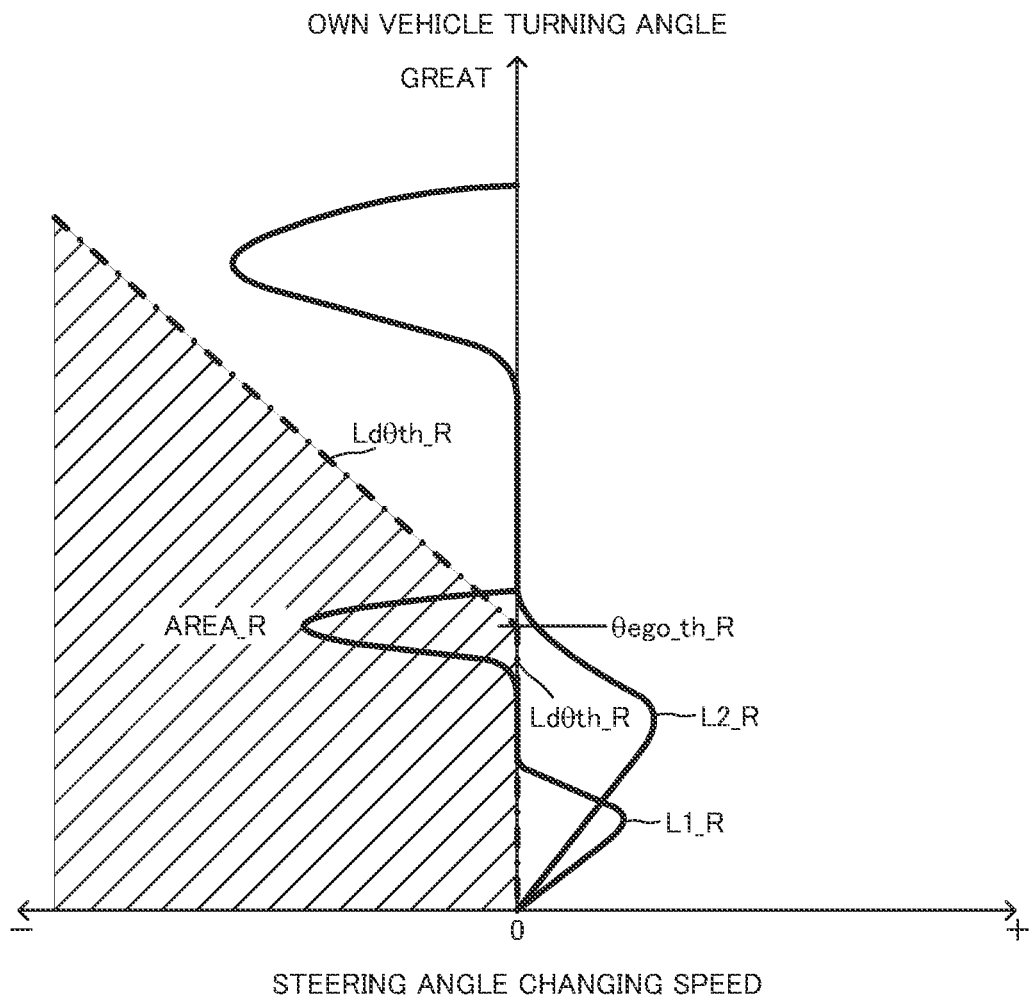
FIG. 14 is a view which shows the steering angle changing speed threshold which can be used when the own vehicle starts to turn with the right turn.

Further, the vehicle collision avoidance assist apparatus 10 may be configured to determine that the collision avoidance forbiddance condition C3 becomes satisfied when the steering angle changing speed dθ has been equal to or smaller than the right turn steering angle changing speed threshold dθth_R for a predetermined time after the own vehicle 100 starts to move rightward. In this case, as shown in FIG. 14, the right turning angle threshold θego_th_R may be set to a value slightly smaller than the own vehicle turning angle θego taken when the reversed steering operation is completed when the own vehicle 100 is driven to change the traffic lanes to the right traffic lane.

Figure 15:
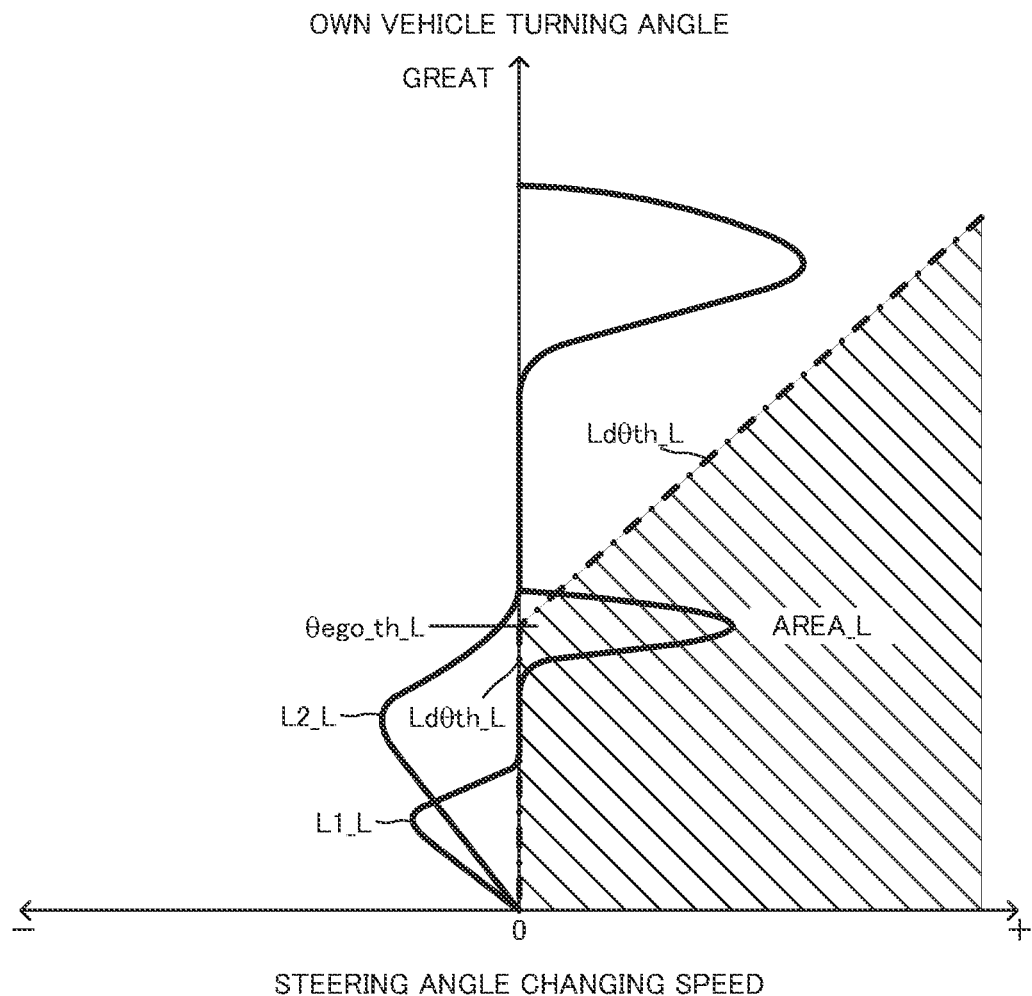
FIG. 15 is a view which shows the steering angle changing speed threshold which can be used when the own vehicle starts to turn with the left turn.

Similarly, the vehicle collision avoidance assist apparatus 10 may be configured to determine that the collision avoidance forbiddance condition C3 becomes satisfied when the steering angle changing speed dθ has been equal to or greater than the left turn steering angle changing speed threshold dθth_L for a predetermined time after the own vehicle 100 starts to move leftward. In this case, as shown in FIG. 15, the left turning angle threshold θego_th_L may be set to a value slightly smaller than the own vehicle turning angle θego taken when the reversed steering operation is completed when the own vehicle 100 is driven to change the traffic lanes to the left traffic lane.

Modified Example 3

Further, the vehicle collision avoidance assist apparatus 10 is configured to (i) determine whether the collision condition C2 is satisfied when the own vehicle turning condition C1 becomes satisfied, (ii) determine whether the collision avoidance forbiddance condition C3 is satisfied when the collision condition C2 becomes satisfied, and (iii) keep stopping the collision avoidance control when the collision avoidance forbiddance condition C3 is satisfied. In this regard, the vehicle collision avoidance assist apparatus 10 may be configured to (i) determine whether the collision avoidance forbiddance condition C3 is satisfied when the own vehicle turning condition C1 becomes satisfied and (ii) eliminate determining whether the collision condition C2 is satisfied when the collision avoidance forbiddance condition C3 is satisfied. In this case, when the collision avoidance forbiddance condition C3 is satisfied, whether the collision condition C2 is satisfied, is not determined. Thus, the collision avoidance control is not executed.

Modified Example 4

Further, the vehicle collision avoidance assist apparatus 10 may be configured to determine that a collision avoidance cancel condition becomes satisfied and stop the collision avoidance control when the driver DR applies a predetermined operation to the steering wheel 35 while the collision avoidance control is executed. In this regard, the predetermined operation to the steering wheel 35 is, for example, an operation which generates at least one of the steering angle θ and the steering angle changing speed dθ of which the absolute values are greater than the absolute values of the steering angle θ and the steering angle changing speed dθ normally necessary to turn the own vehicle 100 right.

<Advantages>

The summary of the operations of the vehicle collision avoidance assist apparatus 10 has been described. With the vehicle collision avoidance assist apparatus 10, the collision avoidance forbiddance condition C3 is changed, depending on the own vehicle turning angle θego. Thus, the unnecessary execution of the collision avoidance control can be avoided when the own vehicle 100 changes the traffic lanes without eliminating the execution of the collision avoidance control when the own vehicle 100 turns right or left.

<Specific Operations of Vehicle Collision Avoidance Assist Apparatus>

Figure 16:
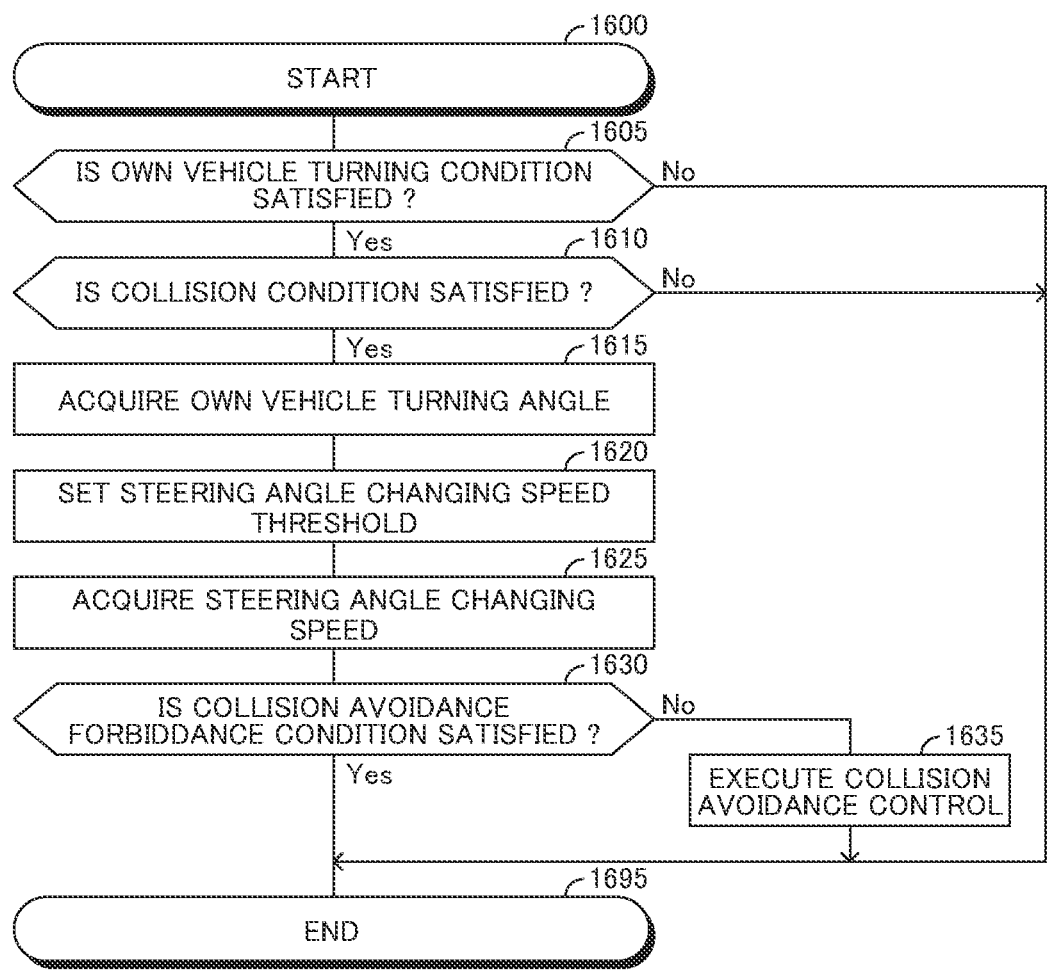
FIG. 16 is a view which shows a flowchart of a routine executed by the vehicle collision avoidance assist apparatus according to the embodiment of the invention.

Next, an example of specific operations of the vehicle collision avoidance assist apparatus 10 will be described. The CPU of the ECU 90 of the vehicle collision avoidance assist apparatus 10 is configured or programmed to execute a routine shown in FIG. 16 with a predetermined calculation cycle. Thus, at a predetermined timing, the CPU starts a process from a step 1600 of the routine shown in FIG. 16 and proceeds with the process to a step 1605 to determine whether the own vehicle turning condition C1 is satisfied.

When the CPU determines "Yes" at the step 1605, the CPU proceeds with the process to a step 1610 to determine whether the collision condition C2 is satisfied.

When the CPU determines "Yes" at the step 1610, the CPU proceeds with the process to a step 1615 to calculate the own vehicle turning angle θego. The own vehicle turning angle θego acquired this time is the own vehicle turning angle θego from when the own vehicle turning condition C1 becomes satisfied to the current time.

Next, the CPU proceeds with the process to a step 1620 to set the steering angle changing speed threshold dθth, based on the own vehicle turning angle θego acquired at the step 1615. As described above, when the own vehicle 100 starts to turn with the right turn, the right turn steering angle changing speed threshold dθth_R is set. On the other hand, when the own vehicle 100 starts to turn with the left turn, the left turn steering angle changing speed threshold dθth_L is set.

Next, the CPU proceeds with the process to a step 1625 to acquire the steering angle changing speed dθ. Next, the CPU proceeds with the process to a step 1630 to determine whether the collision avoidance forbiddance condition C3 is satisfied, based on the steering angle changing speed dθ acquired at the step 1625 and the steering angle changing speed threshold dθth set at the step 1620.

When the CPU determines "Yes" at the step 1630, the CPU proceeds with the process directly to a step 1695 to terminate this routine once. Thereby, the collision avoidance control is not executed.

On the other hand, when the CPU determines "No" at the step 1630, the CPU proceeds with the process to a step 1635 to execute the collision avoidance control. Next, the CPU proceeds with the process to the step 1695 to terminate this routine once.

Further, when the CPU determines "No" at the step 1605 or 1610, the CPU proceeds with the process directly to the step 1695 to terminate this routine once. In this case, the collision avoidance control is not executed.

One example of the specific operations of the vehicle collision avoidance assist apparatus 10 has been described.

It should be noted that the invention is not limited to the aforementioned embodiments, and various modifications can be employed within the scope of the invention.

What is claimed is:

1. A vehicle collision avoidance assist apparatus comprising an electronic control unit configured to:
   prevent execution of a collision avoidance control to avoid a collision of an own vehicle with an object ahead of the own vehicle when the own vehicle turns, a predetermined condition is satisfied, and a collision condition is satisfied,
      the predetermined condition being a condition relating to a steered state of the own vehicle, and
      the collision condition being a condition that the own vehicle is going to collide with the object; and
   execute the collision avoidance control when the own vehicle turns, the predetermined condition is not satisfied, and the collision condition is satisfied,
   wherein the electronic control unit is configured to:
      while the own vehicle turns,
         acquire an own vehicle turning angle which is an angle which the own vehicle has turned about a turning center from when the own vehicle starts turning; and
         change the predetermined condition, depending on the own vehicle turning angle.

2. The vehicle collision avoidance assist apparatus as set forth in claim 1,
   wherein the electronic control unit is configured to acquire as the steered state, at least one parameter representing the steered state with a positive or negative sign, and
   wherein the predetermined condition is a condition which is satisfied in response to acquiring the parameter with a sign opposite to the sign at a point of time when the own vehicle starts to turn.

3. The vehicle collision avoidance assist apparatus as set forth in claim 1,
   wherein the electronic control unit is configured to acquire as the steered state, a reversed steering operation applied to the own vehicle, and
   wherein the predetermined condition is a condition which is satisfied when the own vehicle turning angle is equal to or smaller than a predetermined own vehicle turning angle threshold, and the reversed steering operation is carried out after the own vehicle starts to turn.

4. The vehicle collision avoidance assist apparatus as set forth in claim 1,
   wherein the electronic control unit is configured to acquire as the steered state of the own vehicle, a steering angle changing speed with a positive or negative sign which corresponds to a changing amount per unit time of the steered angle of the own vehicle, and
   wherein the predetermined condition is a condition which is satisfied when an absolute value of the steering angle changing speed is equal to or greater than a predetermined steering angle changing speed threshold.

5. The vehicle collision avoidance assist apparatus as set forth in claim 1,
   wherein the electronic control unit is configured to:
   predict a turning route of an own vehicle and a moving route of an object ahead of the own vehicle when the own vehicle turns;

acquire a predicted reaching time which is a time predicted to be taken for the own vehicle to reach the moving route of the object; and acquire an object position which is a position of the object with respect to the own vehicle when the own vehicle reaches the moving route of the object, wherein the collision condition becomes satisfied when (i) the turning route of the own vehicle crosses the moving route of the object, (ii) the predicted reaching time is equal to or smaller than a predetermined predicted reaching time, and (iii) the object position is within a width of the own vehicle.

6. The vehicle collision avoidance assist apparatus as set forth in claim 5, wherein the electronic control unit is configured to predict the turning route of the own vehicle, based on a yaw rate of the own vehicle.

7. A non-transitory computer-readable medium containing a vehicle collision avoidance assist program programmed to:
prevent execution of a collision avoidance control to avoid a collision of an own vehicle with an object ahead of the own vehicle when the own vehicle turns, a predetermined condition is satisfied, and a collision condition is satisfied,
the predetermined condition being a condition relating to a steered state of the own vehicle, and
the collision condition being a condition that the own vehicle is going to collide with the object; and
execute the collision avoidance control when the own vehicle turns, the predetermined condition is not satisfied, and the collision condition is satisfied,
wherein the vehicle collision avoidance assist program is programmed to:
while the own vehicle turns,
acquire an own vehicle turning angle which is an angle which the own vehicle has turned about a turning center from when the own vehicle starts turning; and
change the predetermined condition, depending on the own vehicle turning angle.

\* \* \* \* \*